US007770122B1

(12) United States Patent
Shaik

(10) Patent No.: US 7,770,122 B1
(45) Date of Patent: Aug. 3, 2010

(54) CODELESS DYNAMIC WEBSITES INCLUDING GENERAL FACILITIES

(76) Inventor: Cheman Shaik, 102 Sattar Residency, H. No. 12-2-39/3, Migh Colony, Murad Nagar, Mehdipatnam, Hyderabad (IN) 500028

( * ) Notice: Subject to any disclaimer, the term of this patent is extended or adjusted under 35 U.S.C. 154(b) by 0 days.

(21) Appl. No.: 12/770,240

(22) Filed: Apr. 29, 2010

(51) Int. Cl.
*G06F 3/00* (2006.01)
*G06F 15/16* (2006.01)

(52) U.S. Cl. .................. 715/744; 715/760; 715/762; 709/201; 709/203

(58) Field of Classification Search ............ 715/744, 715/748, 760, 762, 200, 201; 709/201–203, 709/217–219, 223–224
See application file for complete search history.

(56) References Cited

U.S. PATENT DOCUMENTS

| | | | | |
|---|---|---|---|---|
| 5,845,299 | A | 12/1998 | Arora | 715/209 |
| 5,911,145 | A | 6/1999 | Arora | 715/207 |
| 5,940,834 | A | 8/1999 | Pinard | 1/1 |
| 5,945,989 | A | 8/1999 | Freishtat | 715/760 |
| 6,128,655 | A | 10/2000 | Fields | 709/219 |
| 6,185,587 | B1 | 2/2001 | Bernardo | 715/234 |
| 6,263,352 | B1 | 7/2001 | Cohen | 715/206 |
| 6,343,302 | B1 | 1/2002 | Graham | 715/205 |
| 6,546,397 | B1 | 4/2003 | Rempell | 345/473 |
| 6,581,061 | B2 | 6/2003 | Graham | 1/1 |
| 6,632,249 | B2 | 10/2003 | Pollock | 715/207 |
| 6,671,706 | B1 | 12/2003 | Vinh | 1/1 |
| 6,697,825 | B1 | 2/2004 | Underwood | 715/207 |
| 6,983,287 | B1 | 1/2006 | Jayanti | 1/1 |
| 7,039,658 | B2 | 5/2006 | Starkey | 707/999 |
| 7,047,318 | B1 | 5/2006 | Svedloff | 709/246 |
| 7,120,702 | B2 | 10/2006 | Huang | 709/246 |
| 7,178,101 | B2 | 2/2007 | Tunning | 715/236 |
| 7,240,328 | B2 | 7/2007 | Beckett | 717/113 |
| 7,246,307 | B2 | 7/2007 | Arora | 715/208 |
| 7,263,534 | B1 | 8/2007 | Margulis | 1/1 |
| 7,275,216 | B2 | 9/2007 | Paoli | 715/763 |
| 7,392,510 | B1 | 6/2008 | Treder | 717/128 |
| 7,409,710 | B1 | 8/2008 | Uchil | 726/19 |

(Continued)

*Primary Examiner*—Tadeese Hailu
(74) *Attorney, Agent, or Firm*—Walter J. Tencza, Jr.

(57) ABSTRACT

A method is provided which includes transmitting a template web page from a server computer to a user computer via the internet. The template web page may be received at the user computer. The template web page may be stored in a temporary computer memory of the user computer. The method may further include causing the template web page to be displayed on a computer monitor of the user computer by use of the user computer. The template web page may include a plurality of control buttons, a plurality of visible boxes and a plurality of hidden boxes. The method may further include modifying the template web page in response to activation of one or more control buttons to form a modified template web page. The template web page allows a user to further add more visible items such as boxes, lines and images. Data concerning the modified template web page may be transmitted to the server computer, and stored in a database of the server computer as text. The method may further include transmitting visitor data concerning a first visitor web page of a visitor accessible web site which includes a plurality of visitor web pages, from the server computer to a visitor computer via the internet, wherein the visitor data includes data concerning the modified template web page. The method allows users to host their full-fledged websites including general facilities without any coding and computer programming.

20 Claims, 24 Drawing Sheets

U.S. PATENT DOCUMENTS

| | | | |
|---|---|---|---|
| 7,437,660 B1 * | 10/2008 | Mehta et al. | 715/205 |
| 7,458,021 B2 | 11/2008 | Balasabramanyan | 715/235 |
| 7,536,641 B2 | 5/2009 | Rosenstein | 715/234 |
| 7,581,173 B1 | 8/2009 | Ferguson | 715/235 |
| 7,594,168 B2 | 9/2009 | Rempell | 715/234 |
| 7,610,219 B2 | 10/2009 | Sayed | 705/26 |
| 7,668,913 B1 | 2/2010 | Underwood | 709/205 |
| 2001/0037380 A1 * | 11/2001 | Wall et al. | 709/219 |
| 2002/0032700 A1 | 3/2002 | Ebata | 715/234 |
| 2002/0169851 A1 | 11/2002 | Weathersby | 709/218 |
| 2002/0184329 A1 | 12/2002 | Chen | 709/213 |
| 2003/0121004 A1 | 6/2003 | Christensen | 715/236 |
| 2003/0163519 A1 | 8/2003 | Kegel | 709/203 |
| 2003/0221162 A1 | 11/2003 | Sridhar | 715/229 |
| 2004/0128620 A1 | 7/2004 | Lund | 715/234 |
| 2005/0081141 A1 | 4/2005 | Jonsson | 717/116 |
| 2005/0210379 A1 | 9/2005 | Weathersby | 715/234 |
| 2005/0246627 A1 | 11/2005 | Sayed | 715/234 |
| 2006/0020681 A1 | 1/2006 | DePree | 709/217 |
| 2006/0112324 A1 | 5/2006 | Bush | 715/234 |
| 2007/0118793 A1 | 5/2007 | Arora | 715/234 |
| 2007/0204013 A1 | 8/2007 | Castrucci | 709/219 |
| 2008/0046327 A1 | 2/2008 | Schnietz | 705/26 |
| 2008/0059574 A1 * | 3/2008 | Almeida | 709/203 |
| 2008/0065974 A1 | 3/2008 | Campbell | 715/200 |
| 2008/0071929 A1 | 3/2008 | Motte | 709/246 |
| 2008/0098028 A1 | 4/2008 | Shan | 1/1 |
| 2008/0109715 A1 | 5/2008 | Stover | 715/237 |
| 2008/0172608 A1 | 7/2008 | Patrawala | 715/255 |
| 2008/0201421 A1 * | 8/2008 | Adelman et al. | 709/204 |
| 2008/0228809 A1 | 9/2008 | Shan | 1/1 |
| 2008/0313260 A1 * | 12/2008 | Sweet et al. | 709/201 |
| 2008/0320381 A1 | 12/2008 | Sercel | 715/234 |
| 2009/0006454 A1 | 1/2009 | Zarzar | 1/1 |
| 2009/0031213 A1 | 1/2009 | Goldenberg | 715/235 |
| 2009/0210352 A1 | 8/2009 | Chang | 705/80 |
| 2009/0210358 A1 | 8/2009 | Chang | 705/500 |
| 2009/0210503 A1 | 8/2009 | Chang | 709/206 |
| 2009/0235158 A1 | 9/2009 | Rosenstein | 215/234 |
| 2009/0259934 A1 | 10/2009 | Prisament | 715/234 |
| 2009/0327101 A1 | 12/2009 | Sayed | 705/27 |
| 2010/0017703 A1 * | 1/2010 | Glickman et al. | 715/234 |
| 2010/0076863 A1 * | 3/2010 | Golomb | 705/27 |

* cited by examiner

Your advertisement has been hosted.

Please click the following button to host your website.

Go — 301

300

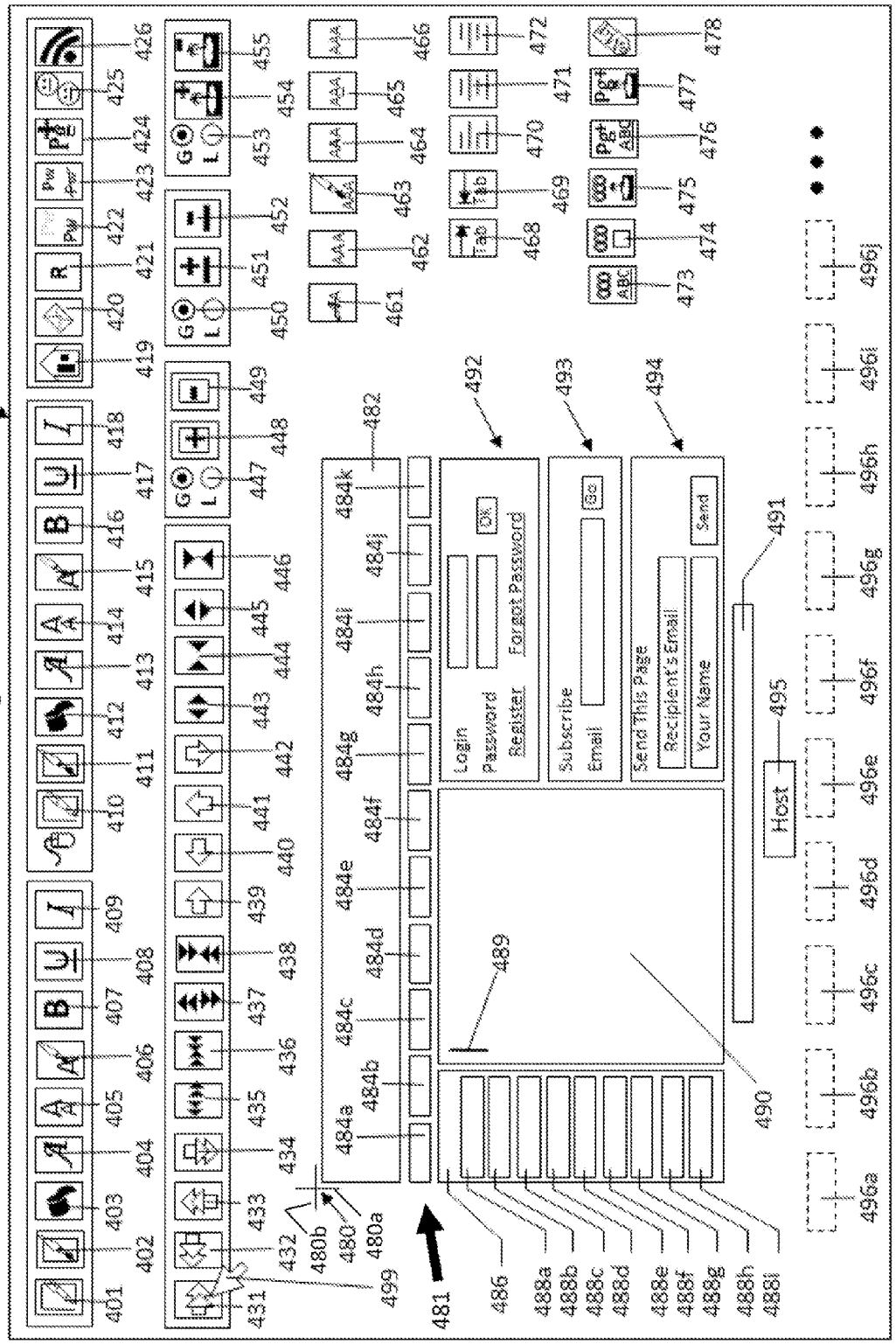

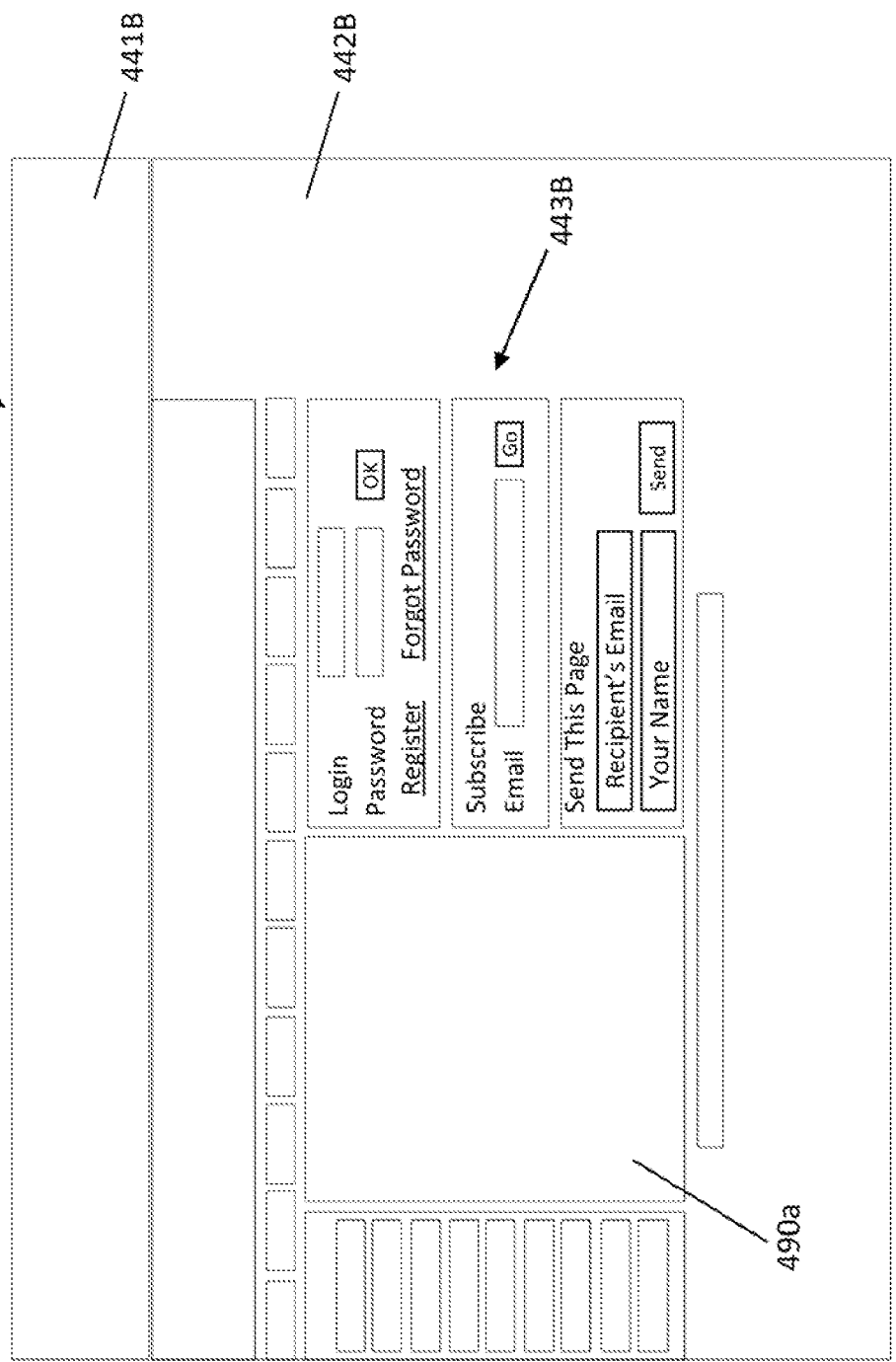

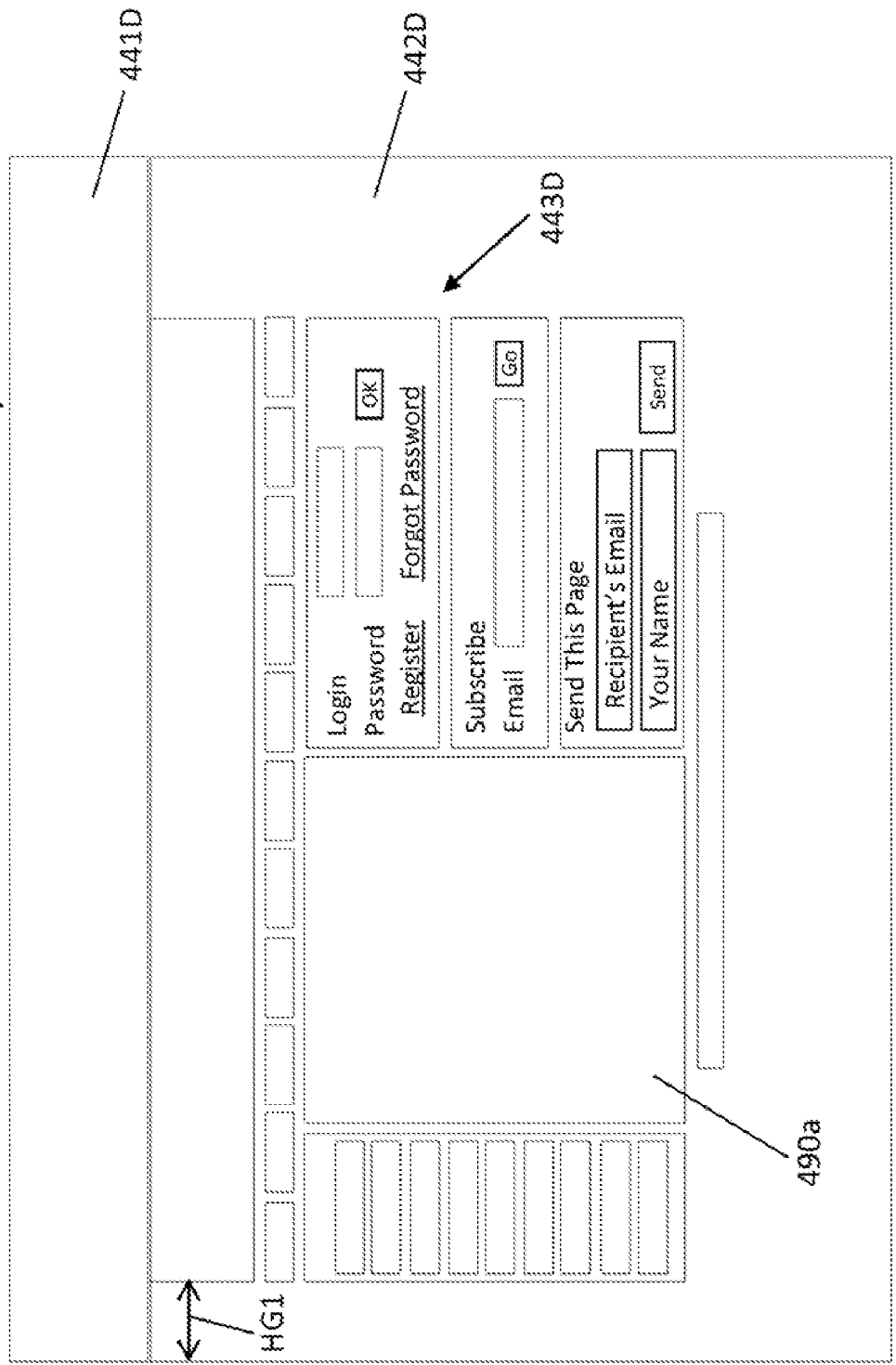

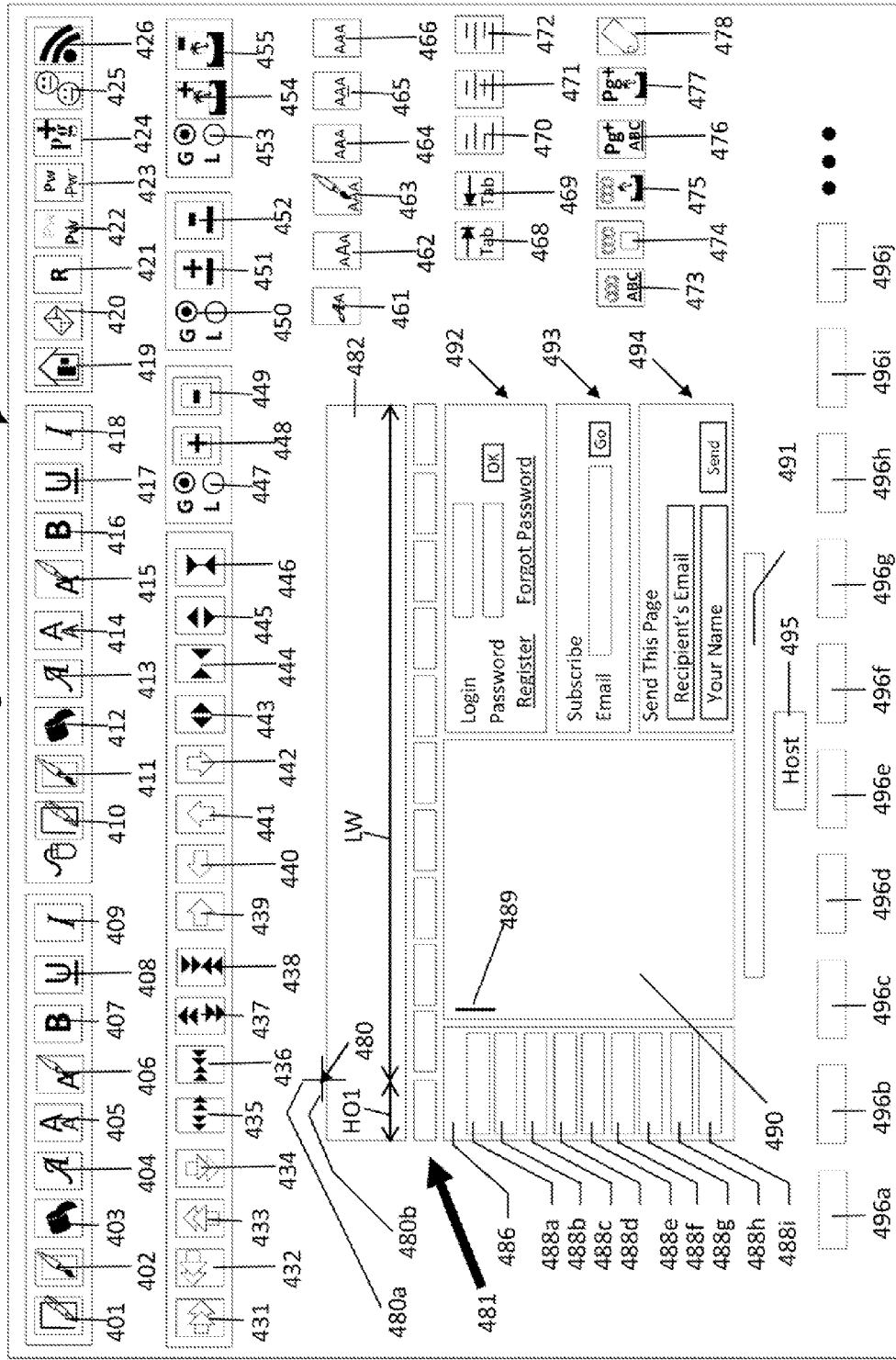

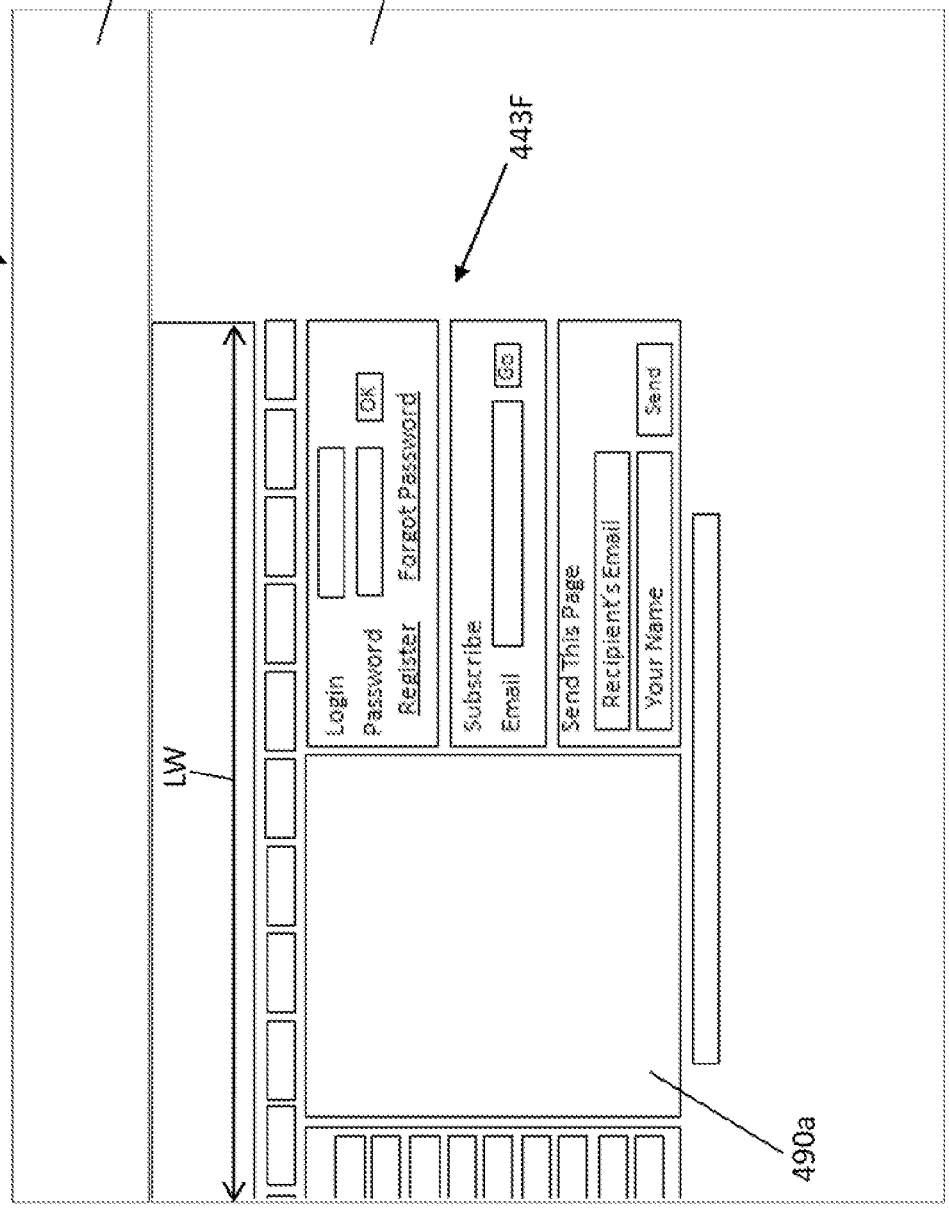

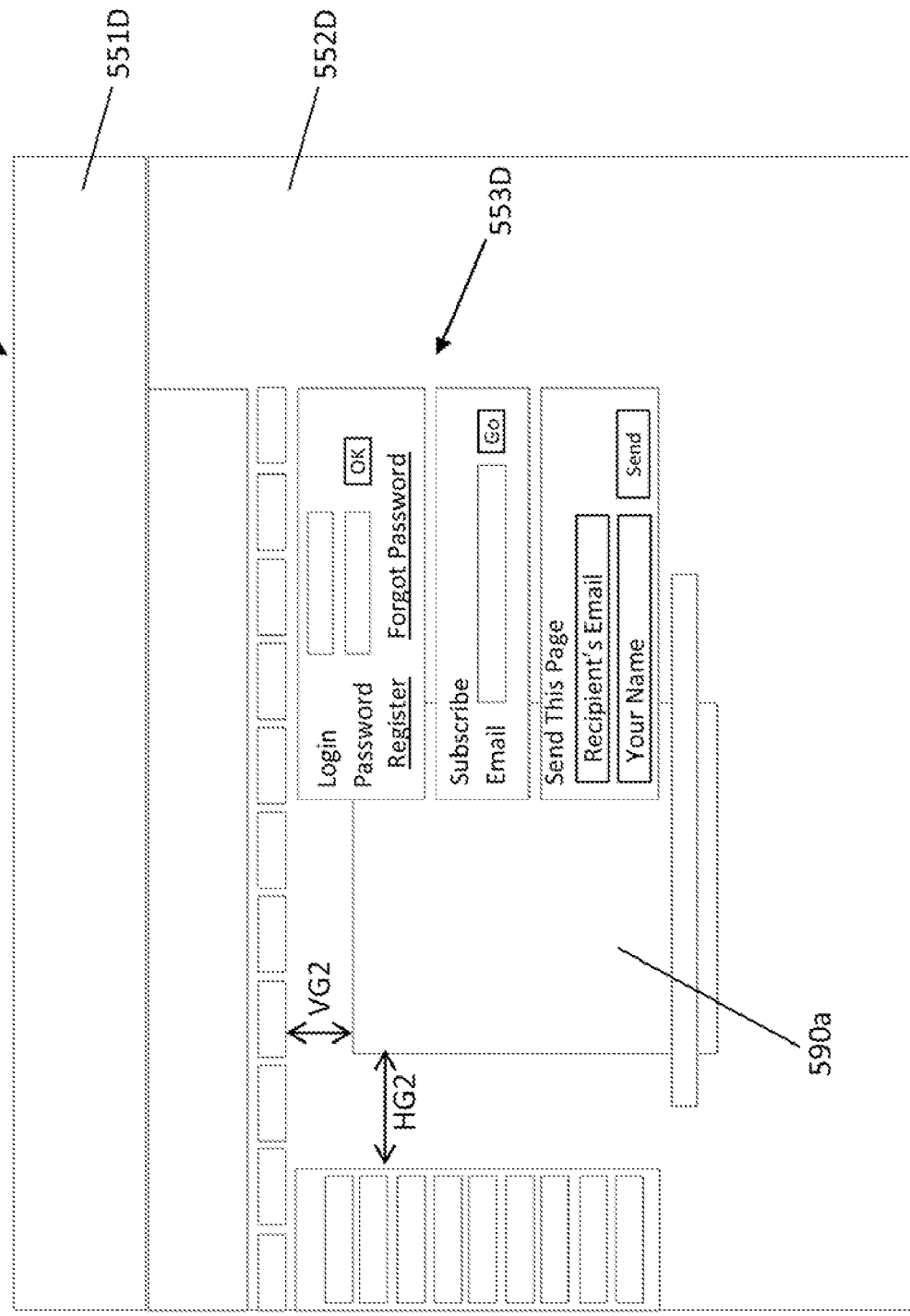

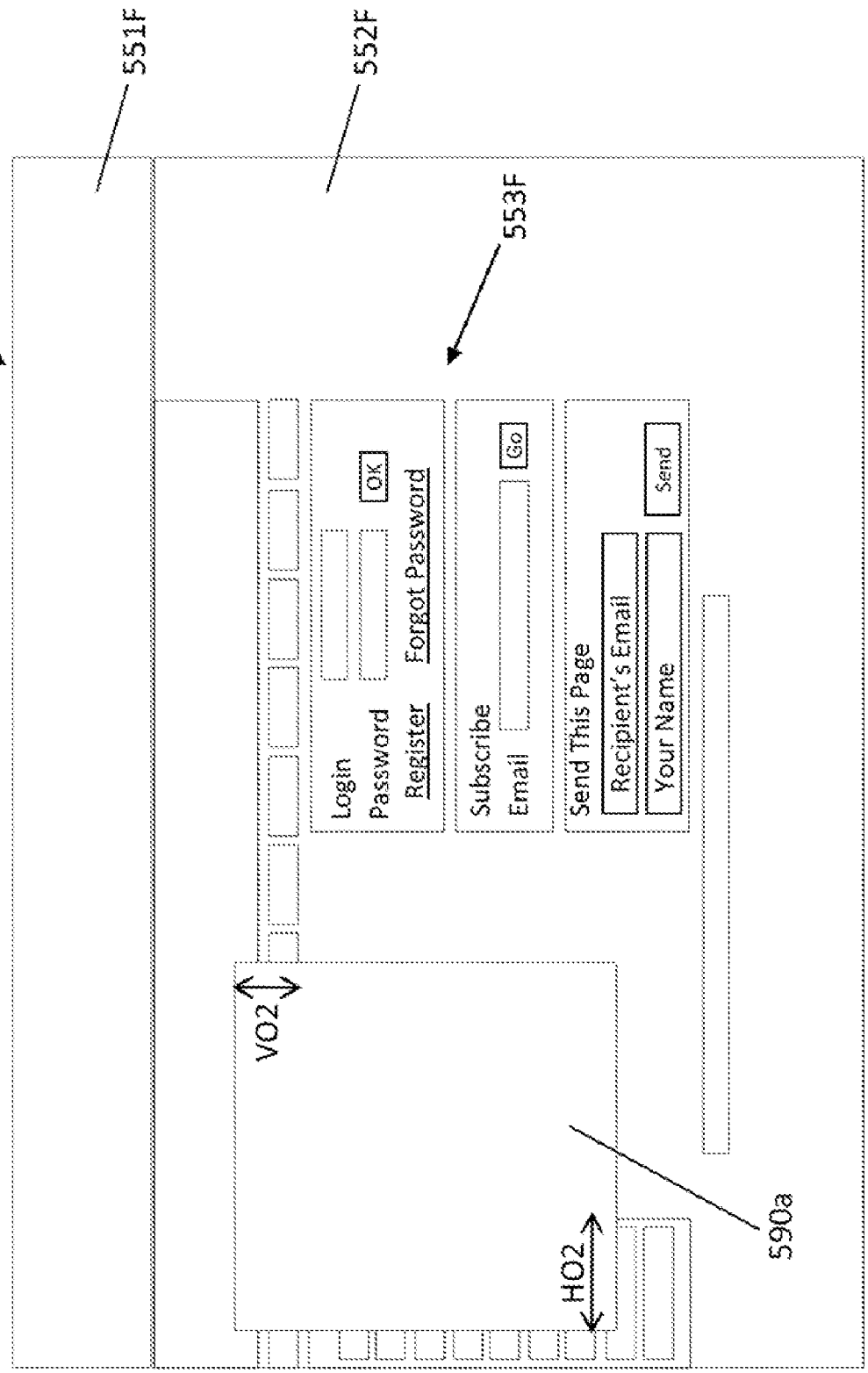

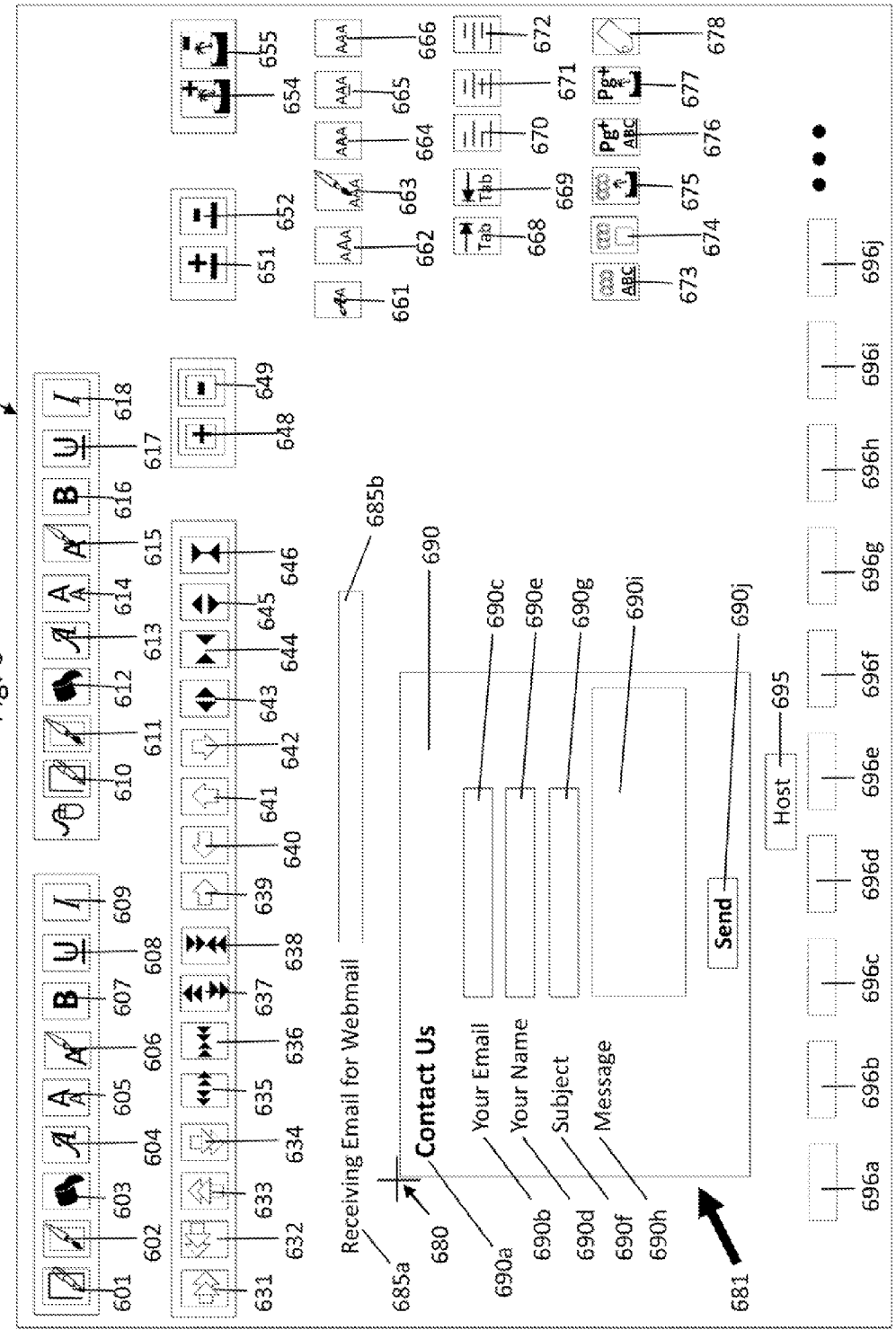

Fig. 11 — 1100

Select the RSS Feeds that you would like to add to your website

- ☐ Breaking News
- ☐ Sports
- ☐ Political
- ☐ Bullion Rates
- ☐ Stocks
- ☐ Science & Technology
- ☐ Health & Fitness
- ☐ Banking & Mortgage
- ☐ Automobile
- ☐ Computers
- ☐ Software

- ☐ Movies
- ☐ Business
- ☐ Entertainment
- ☐ Forex
- ☐ Top Stories
- ☐ Weather
- ☐ Kids
- ☐ Teens
- ☐ Seniors
- ☐ Women
- ☐ Travel

- ☐ Shopping
- ☐ Fashion
- ☐ Music
- ☐ Books
- ☐ Real Estate
- ☐ Recipes
- ☐ Careers
- ☐ Electronics
- ☐ Dating
- ☐ Astrology
- ☐ Education

OK — 1195

1196a 1196b 1196c 1196d 1196e 1196f 1196g 1196h 1196i 1196j

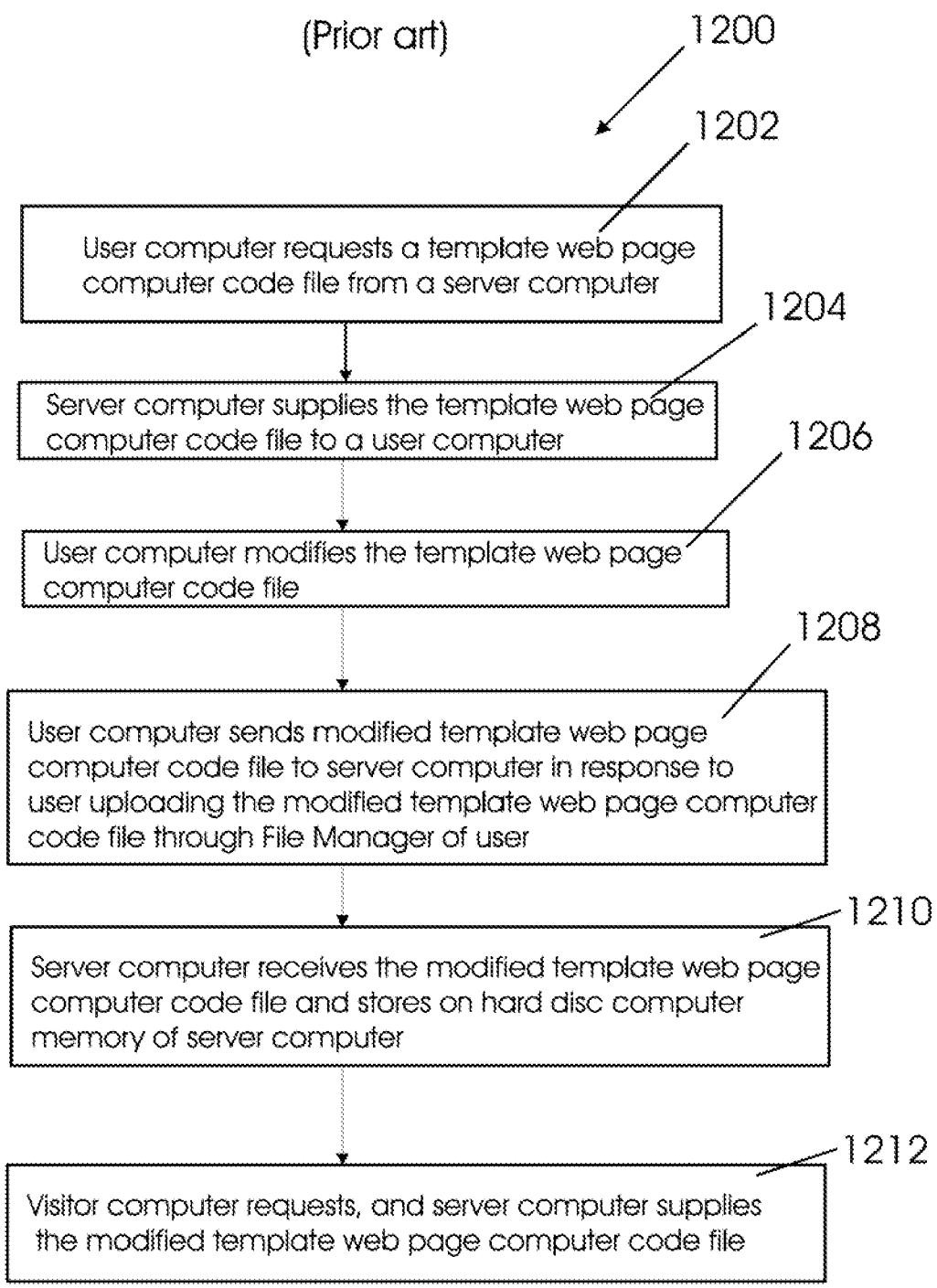

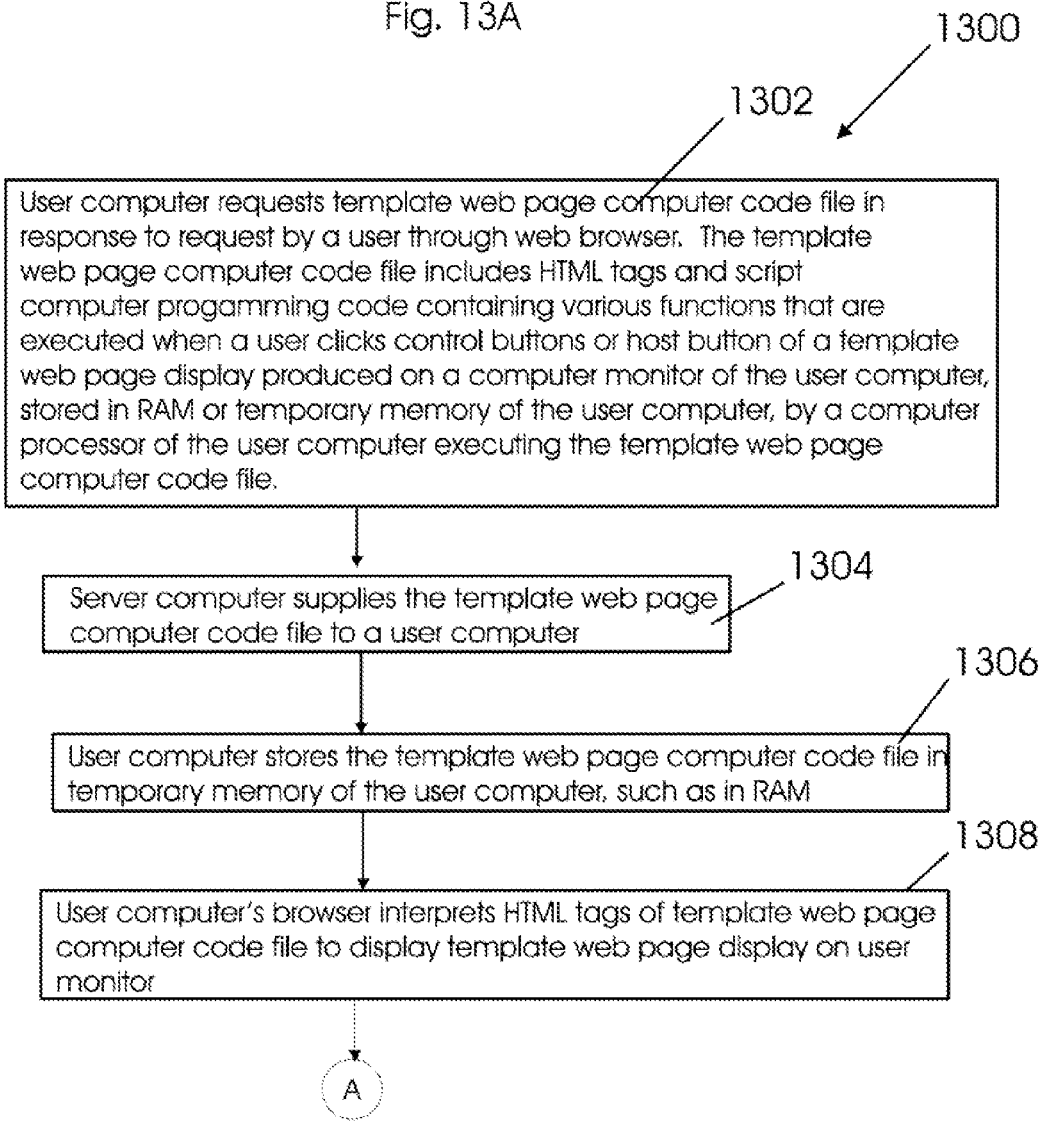

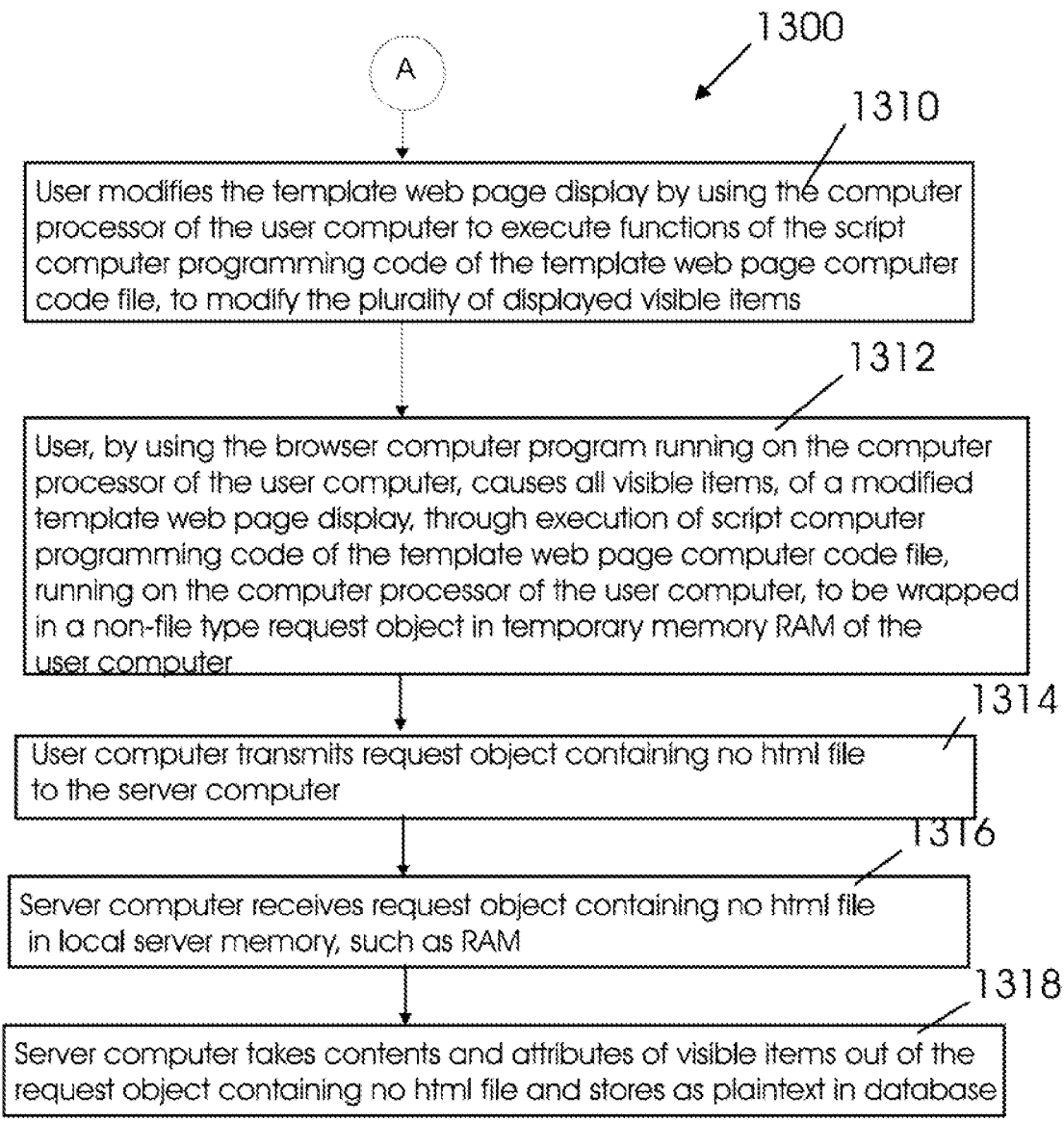

CODELESS DYNAMIC WEBSITES INCLUDING GENERAL FACILITIES

FIELD OF THE INVENTION

The present invention relates to website hosting without coding.

BACKGROUND OF THE INVENTION

A website is a collection of web pages, images, video clips, and general user facilities such as email, chat, user registration, login, password maintenance, page referral, subscription, downloads, shopping cart, backend database and so on. Every website hosted on the World Wide Web represents a business, organization, network of people, or public utility. A website provides a strong identity to its owning entity on the Internet and spreads its popularity globally across its geographic borders.

Initially, developing and hosting websites required specialized coding and programming skills such as HTML (Hyper Text Markup Language), JavaScript, Pen, PHP (Hypertext Preprocessor), JSP (Java Server Pages), ASP (Active Server Pages) and so on. Later, the advent of WYSIWYG (What You See Is What You Get) web pages and Template-based editors eliminated the need of coding, thereby enabling even non-technical people to develop and host their websites without any expenditure. However, even with these editors, developing full fledged websites that include general user facilities has still remained a tough task for non-technical people.

Google (trademarked) sites and Yahoo (trademarked) Site Builder enable non-technical people to develop their own web sites without any technical knowledge and coding skills. However, these systems do not enable an individual to add general facilities to a website such as webmail, subscription, send page, user registration, login page and supporting backend system, password maintenance, chat box, RSS (Really Simple Syndication) feeds etc. Further, the look and feel of the websites that these systems enable to develop is not at par with those developed by professional web site developers. These shortcomings call for a new concept of developing full-fledged, codeless websites with all general facilities.

In a general sense, it is known in the art, that "hidden boxes", "hidden fields", or "hidden input fields" are known parts of a specific html (hypertext markup language) web page code (or other types of web page codes). These known "hidden boxes", "hidden fields", or "hidden input fields" by their known nature and known utility do not control the content of a specific web page display rendered by the specific html web page code in which the "hidden boxes", "hidden fields", or "hidden input fields" are located. In the prior art, these known "hidden boxes", "hidden fields", or "hidden input fields" are not manually accessible to users and are filled only programmatically, such as by executing a program or script, such as a Java (trademarked) script. In the prior art, these "hidden boxes", "hidden fields", or "hidden input fields" are typically filled programmatically with information such as a username when a user logged into his account, which is required for verification before allowing access to a further web page. In the prior art, these "hidden boxes", "hidden fields", or "hidden input fields" may also be filled with a product identification that a user has selected for purchase on a electronic commerce (e-commerce) web site, which may be required for product identification in a next processing page to be displayed on a client computer.

SUMMARY OF THE INVENTION

One or more embodiments of the present invention relate to a web hosting system and a method that enable even non-technical people to host their own websites without coding, including general facilities such as webmail, chat, subscription, send page, user registration, login, password maintenance, advertisement hosting, chat box, RSS Feeds etc.

For the purpose of explaining the concept and method of one or more embodiments, of this patent application, all web pages of a website other than the home page are called "secondary pages". Similarly, a person who hosts a website is called a "user" whereas a person who visits a website is called a "visitor". The codeless website development and hosting system provides a hosting page including a home page template, which is comprised of html text boxes and text areas that can be moved, resized and formatted for one or more of background color, border color, border thickness, font family, font size, font color, bold, underlining, italics, mouse-over effects etc. Text boxes and text areas may be provided individually or as groups depending on their purpose. While individual text boxes and text areas of the home page template form are converted into html buttons or tables, grouped text boxes and text areas are converted into facility forms in the actual web page of the website. Facility forms include login form, send page form, subscription form, registration form, password reset form etc. The dimensions, locations, borders, colors, fonts and mouse-over effects etc of text boxes, text areas, lines, images and other items are carried over to their respective transformed items in the actual web page that visitors view on the website. The hosting page is also comprised of a set of control buttons outside the web page design area through which the position, size, borders, fonts, colors, mouse-over effects etc of the text boxes and text areas can be controlled. The set of control buttons is also comprised of buttons to create forms such as for webmail, registration, forgot password and password reset. One of the control buttons enables an individual to create and add secondary web pages to the website, while another of the control buttons enables an individual to add images to a webpage. Once an image is added to a web page at a default position, it can be relocated using location control buttons. Similarly, a user can add horizontal lines and relocate them using relevant control buttons. The home page template is comprised of a set of empty text boxes and text areas providing the look and feel of a typical website layout. A user may fill in the text boxes and text areas with content, resize and relocate the text boxes and text areas as required, change colors, borders, fonts and mouse-over effects of the text boxes and text areas, and then submit the form to the hosting server by clicking the "Host" button provided in the hosting page. The hosting page is also comprised of some hidden boxes, hidden fields, or hidden input fields, to which all attributes of the items of design area are written when the "Host" button is clicked. In a general sense, "hidden boxes", "hidden fields", or "hidden input fields" are known terms of art for parts of a web page code, which are hidden from a user and which do not control the layout and/or format of a web page display rendered by the specific web page code in which the "hidden boxes", "hidden fields", or "hidden input fields" are located.

In at least one embodiment of the present invention, immediately after writing the attributes to the hidden boxes, the form is submitted to a server computer by which all attributes of each item are sent to the server computer where they are stored in a computer memory of the server computer, such as a database of the server computer. When a web page is accessed by a visitor on the Internet, the server computer retrieves the details of all the text boxes, text areas, lines, images and other elements of the web page from the database and passes them to the visitor's computer, where the browser composes and displays the web page. The content labels, dimensions, locations, colors, fonts, mouse-over effects etc., of the web page items are decided by the browser of the visitor computer depending on the details received from the server computer. All items are displayed on the web page at their respective locations as recorded in the database or computer memory of the server computer. The hosting page also comprises controls such as radio buttons for grouping and ungrouping boxes in facility forms of the web page. Form items can be grouped or ungrouped by switching the option through the radio buttons. After selecting the group option of the radio button associated with boxes, if a user keeps a cursor in any box of a facility form and clicks a location control button, the facility form is moved on the hosting page as a whole, thereby saving a lot of time for development users. Instead, if the same activity is done after selecting the ungroup option, only that particular box of the facility form holding the cursor is moved. The home page template comprises a set of well organized and positioned text boxes and text areas representing a typical website home page. A user may fill in the text boxes with labels and text areas with content, and further define their fonts, borders, colors, and mouse-over effects as required. If needed, a user can create additional text boxes and text areas or remove the existing ones and further modify them as required using the relevant control buttons. Horizontal lines can be created with default size at default locations, and resized and relocated using relevant control buttons. Similarly images can be added at a default location and relocated using the relevant control buttons. By default, all items of the home page except the main content text area are treated as global, meaning the items are displayed in every page of the website at the same locations. However, some items may also be tagged as local to the home page. To create such local items in a home page, a user should select the "Local" option of the radio button associated with the item type before creating the item. Local items of a home page will be displayed only in the home page and not in any other pages.

A secondary web page may be created by clicking a "Create New Page" (Pg+) control button keeping the cursor in the text box or text area to which the new page should be linked. Similarly, a new page that links to an image may be created by clicking on the image and subsequently clicking a "Pg+" control button. A click action on a "Pg+" control button opens a hosting page including an empty secondary or second page template comprising only a text area for defining content of a secondary web page. The user may relocate, resize and reformat the content box, fill it with content, and click the "Host" button, which writes all attributes and content of the secondary page to a hidden box of the hosting page and immediately submits the hosting page to the server computer. The server computer stores all attributes and content of the secondary page in a computer memory of the server computer, such as a database of the server computer. When a website visitor visits the website and clicks the button that links to the secondary web page, the server computer retrieves the content and all attributes of the secondary web page and passes them to the visitor's computer, where the secondary web page is constructed and displayed on a computer monitor of the visitor computer typically by a computer software browser program stored on and executed on the visitor computer. In at least one embodiment of the present invention, a secondary page template does not comprise any text boxes that will be converted into html tables or buttons in the actual web page for website navigation, such as comprised by the home page. The navigation buttons, lines and images of the home page are treated as global items and therefore received from the server computer and displayed by a computer processor of the visitor computer on a computer monitor of the visitor computer in every secondary page of the website when accessed by visitors. However, a user can add local items to a home page by first selecting the local option of the radio button associated with the control button used to create the items and then clicking on the control button. A secondary web page does not comprise any global items, and all its items are treated as local. Items added to a secondary page do not appear in any web page except the web page they are added to. Items can be added to a secondary web page using relevant control buttons the same way they are added to a home web page. However, care should be taken that the items added to a secondary web page do not overlap the global elements of the home web page, as it may degrade appearance of the secondary web page on a computer monitor of a visitor computer. Any number of secondary web pages can be created and linked to existing items of the home page.

A new item can be added to a home or a secondary web page by clicking the "Add" control button of that item type, which brings a zero-size or negative positioned hidden item of the hosting page, into existence by imparting it a specific size and location. A user may resize, relocate and reformat the new item as required using relevant control buttons. Also, existing items of the home web page can be made to disappear by clicking a "Remove" control button of that item type, which in one embodiment sets the item size to zero or moves the particular item to a negative coordinate on the particular hosting page, thereby making it invisible in spite of its physical existence. Items of the home page can be moved and resized also by drag-and-drop mouse operations.

Website forms such as for subscription, send page, login may be provided as part of the home page template as most known prior websites feature them. However, in accordance with an embodiment of the present invention, a user, using a computer interactive device such as a computer mouse of a user computer, can remove any of these forms, if deemed unnecessary, by shifting them to the invisible (negative) area from the visible (positive) area of the web page using a control button. These forms can be resized, repositioned and reformatted using relevant control buttons, in accordance with an embodiment of the present invention. Once a web page design is complete, in at least one embodiment, a user should click, using a computer interactive device of a user computer, a "Host" button, which in one embodiment writes the content and attributes of all items of the web page to hidden boxes of the hosting page and immediately submits them to a server computer. The server computer stores the content and all attributes of the web page items in a database. When a visitor visits the web page, the content and attributes of all items of the web page are retrieved from the database and passed to the particular visitor's computer, where the web page is displayed on a computer monitor of the visitor's computer using the particular visitor's computer software browser program.

The codeless website hosting system also enables a user to incorporate dynamic effects such as color/font/border changes on mouse-over actions of html buttons and tables. All these dynamic effects are converted to data and written to hidden boxes of a hosting page before the hosting page is submitted to server computer, where they are stored in a database.

A webmail facility can be provided on a user's website without requiring him or her to do any coding and without requiring him or her to upload any files to a server computer. In at least one embodiment, when a user keeps a cursor in a text box, using a computer interactive device of a user computer, and clicks the "Create Webmail" button, a webmail form template comprising editable, formatable labels and boxes will open in a new window on a computer monitor of the user computer. In at least one embodiment, the user can modify the background color and border of the form as well as the colors, fonts and borders of the labels and input boxes. Above the design area of the form, an input box is also provided wherein the user can enter his or her email id where he or she wants the web mails to be sent. Once the receiving email id (identification) is defined and the form is modified, a user may click, using a computer mouse of the user computer, a host button provided at the bottom, following which attributes of all input boxes and labels may be written to hidden boxes of the template web page and immediately submitted to the server computer, where they are stored in a database. When a visitor clicks a "Contact Us" button of the website, or whatever button the webmail was linked to by the user, the server computer retrieves all attributes of the webmail form and passes them to the visitor's computer, where the webmail page is constructed and displayed on a computer monitor of the visitor computer by a computer software program browser running on the visitor computer. The displayed webmail page also comprises the receiving email id in a hidden box. Once the visitor fills the boxes of the webmail form such as "To", "From", "Name", "Subject", and "Message" and submits the form, the mail is sent to the receiving email id provided in the hidden box.

A "Send Page" facility can be provided on a user's website without requiring him or her to do any coding or file uploading. To add this facility on the website's home page, the user need not do anything additionally. Since a "Send Page" form is displayed as part of a home web page template, the facility is added by default to a home web page when a user hosts his or her home web page. However, before hosting a home web page, a user may do any changes to the labels, input boxes, border and background of the "Send Page" form. When the user hosts his or her home page, all attributes of the send mail form are written to some hidden boxes of the hosting page and immediately submitted to the server computer, where they are stored in a database. When a visitor visits the home page of the website, the server computer retrieves from the database all attributes of the "Send Page" form and passes them to the particular visitor's computer, where the form is constructed and displayed on a computer monitor of the visitor computer as part of the home web page. A visitor may send the web page to a person he or she knows by filling the form and clicking the send button. In case the user does not want a "Send Page" form on his or her website, it can be removed by keeping a cursor in the "Send Page" form and clicking the "Remove" control button, by using a computer interactive device such as a computer mouse of a user computer.

A Chat facility can be provided on a user's website that enables website visitors to chat with the user. A click, by a user, using a computer mouse of a user computer, on the chat control button in the home page template will open a new window comprising a number of images that are loaded from the server computer from which one can be selected by clicking. The new window also comprises a link such as "Select Your Own Image" and when this is selected, by clicking by a user using a user computer, a dialogue box will open for the user to select his or her own image from his or her user computer. The selected Chat graphic is displayed at a default location on the home page template which can be relocated to a different place through position control buttons. When the user hosts his or her home page the chat image identification number will be written to a hidden box and immediately submitted to the server computer, where it is stored in a database. When a visitor visits the particular website, the same identification number is retrieved from the database and accordingly the related chat image is displayed on the website on a computer monitor of the visitor computer. The chat image is linked to a URL (Uniform Resource Locator) on the web server where a chat application is installed. A chat window opens on a computer monitor of the visitor computer when a visitor clicks on the chat image and enables him or her to chat, using the visitor computer, with the user, using the user computer, if the user is online. Also, the chat graphic comprises an On/Off switch that indicates whether the user is online or offline.

A Subscribe facility can be added to a user's website, which enables website visitors to subscribe to the website's emails. A subscription form template is provided, in at least one embodiment of the present invention, as part of a home page template. The form may be comprised of a label, an input box and a "Subscribe" button. The subscription facility, in at least one embodiment, may be added by default to the user's website when he or she hosts his or her home web page. However, a user can change the background, border, color, font and label of the subscription form before hosting the home web page. When the home web page is hosted, all attributes of the subscription form are written to hidden boxes of the hosting page of the home web page template and immediately submitted to the server computer, where they are stored in a database. When a visitor visits the website home page, using his or her visitor computer, all attributes of the subscription form are retrieved from the database and passed to the visitor computer, where the subscription form is constructed and displayed on a computer monitor of the visitor computer as part of the home page. When a visitor who wants to subscribe for the website's email service, enters his or her email id (identification) and submits the subscription form, the email id is submitted to the web server computer, where it is stored in a database. A utility program on the web server computer retrieves email ids of all subscribers and sends them emails as and when the website operator or user mandates. A user who does not want to incorporate this facility on his or her website can remove it by keeping the cursor, of an interactive device of a user computer, in the form and clicking the remove button.

A user can add an RSS feeds facility to his or her website that displays the latest news, stock rates, forex (foreign exchange market) rates etc. In at least one embodiment of the present invention, the hosting page of home web page template comprises a button that enables a user to add RSS feeds. In order to add RSS feeds, a user needs to click, using the user computer, an "Add RSS Feeds" button, which displays a list of RSS feeds available on the server computer, out of which a user can select whatever RSS feeds he or she wishes to add to his or her website and submit the form to a server computer. The information about the selected RSS feeds is written to hidden boxes of the RSS Feeds selection page and submitted to the server computer, which stores the received information of RSS feeds in a database. When a visitor visits the website and clicks the button linked to RSS feeds, the server computer retrieves the information of the RSS feeds from the database as selected by the user and passes the information or data concerning the RSS feeds to the visitor's computer, and a web page with links to the RSS feeds is displayed on a computer monitor of the visitor computer by a computer software browser program running on the visitor computer.

A user can add Registration, Login, and Password Maintenance facilities to his or her website to enable visitors to register themselves with the website, login to their accounts and carry out password maintenance activities such as password change, reset of forgotten password etc.

A hosting page comprising a registration form template can be opened by a user clicking a relevant button assigned for the task on a user computer. A user can redesign his or her registration form by changing the borders, fonts, box colors etc. While the registration form template comprises labels and boxes such as user id, password, name, sex, date of birth, profession, qualification, address, a user can remove some of the existing labels and boxes and add new labels and boxes as he or she deems necessary, using the user computer. Once the form design is complete, the user may click a Host button, on a computer monitor of the user computer, using a computer mouse of the user computer, which immediately writes all the form attributes to hidden boxes of the hosting page and submits them to the web server computer, where they are written to a database. In at least one embodiment, when a website visitor clicks, using a computer mouse of the visitor computer, a "Register" link in a login panel of a web page on a computer monitor of the visitor computer, the server computer retrieves all attributes of the registration form from the database and passes them to the visitor computer, where the form is constructed and displayed on a computer monitor of the visitor computer by a computer software web browser computer program executed by a computer processor of the visitor computer. The attributes of a "form" in general may include data or information concerning border color, width, background and foreground colors and text of every element of the "form" such as labels, input boxes, buttons, etc.

A visitor may fill in his or her details and register himself or herself on the website by clicking the "Register" button on a computer monitor of the visitor computer using a computer mouse of the visitor computer. All details of the registrant, in at least one embodiment, are submitted to the web server computer, where they are stored in a database. The details are retrieved by a verification program on the server computer when the visitor logs into his or her account on the website.

A user can add a login form to his or her website without any coding or uploading of files to the sever computer. In at least one embodiment, a default login form is provided as part of a home web page template. When a user hosts his or her home web page, the default login form is also hosted as part of the home web page. However, the login form can also be redesigned by keeping a cursor, on a computer monitor of the user computer, in required boxes of the default login form and changing their attributes such as colors, fonts, borders etc before hosting the home page. When the home page is hosted, all the attributes of the login form are written to some hidden boxes of the hosting page comprising the home page template and immediately submitted to the web server computer, where they are stored in a database. When a visitor visits the website home page, using a visitor computer, the login form attributes are retrieved from the database, using which the login form is constructed and displayed on visitor's computer as part of the home page.

A "Forgot Password" form may also be added by a user to his or her website. A hosting page comprising a "Forgot Password" form template opens when a user clicks, using a computer mouse of the user computer, the relevant button on a computer monitor of the user computer. The "Forgot Password" form template comprises labels and input boxes for user id and email id. A user may redesign the form for its look and feel and click the "Host" button at the bottom, following which the form attributes are written to hidden boxes of the page and submitted to the web server immediately, where they are stored in a database. When a visitor clicks the "Forgot Password" link in the login panel of a web page of the website, all attributes of the form are retrieved from the database, and the form is constructed and displayed in a separate window on a visitor's machine. A visitor may enter his or her user id (identification) and email id (identification), using an interactive device of the visitor computer, that he or she provided at the time of registration and submit the form to the server computer by clicking the submit button on a computer monitor of the visitor computer, following which a verification program on the web server computer checks whether the user id and email id pair exists in the database. The program sends a temporary password and a link to password reset page to the visitor's email id (identification).

A "Password reset" form may be added by a user to his or her website. A hosting page comprising a template of the form can be opened by clicking a relevant button, with a user computer mouse of a user computer. The look and feel of the form can be changed as the user wishes. The "Password Reset" form template comprises labels and input boxes for user id, old password, new password and confirm new password, and a Reset button. The "Password reset" form can be hosted by clicking the Host button provided on the hosting page. When the host button is clicked, by a user using a computer mouse, for example, of the user computer, all attributes of the form are written to hidden boxes of the hosting page and immediately submitted from the user computer to the server computer, where they are stored in a database. The "Password reset" form opens when a visitor clicks, using a computer mouse, for example of the visitor computer, the "Password reset" link in a web page of the website or in an email received from the web server on his or her request for a temporary password. The form is constructed with the attributes retrieved from the database and displayed in a new window on the visitor computer. Once the form opens on a computer monitor of the visitor computer, the visitor may fill in his or her user id, old/temporary password, new password and confirm new password, and submit the form to the server computer, where a "Password reset" program updates the visitor's password.

BRIEF DESCRIPTION OF THE DRAWINGS

FIG. 4A shows a hosting page comprising a set of control buttons, a website home page template, and a set of hidden boxes, in accordance with an embodiment of the present invention, wherein the hosting page of FIG. 4A will be displayed on the user computer of FIG. 1 by a computer processor executing computer software web browser program stored in computer memory of the user computer of FIG. 1;

FIG. 4B shows a top, left aligned website home page displayed on a computer monitor of the visitor computer of FIG. 1, by a computer software web browser program stored in computer memory of the visitor computer and executed by a computer processor of the visitor computer, in accordance with an embodiment of the present invention;

FIG. 4D shows a website home page displayed with a left margin on a visitor computer of FIG. 1, in accordance with an embodiment of the present invention, wherein the website home page of FIG. 4D is displayed on a computer monitor of the visitor computer of FIG. 1, by a computer software web browser program stored in computer memory of the visitor computer and executed by a computer processor of the visitor computer;

FIG. 4E shows a hosting page including a website home page template shifted across cross-hairs in horizontal direction, in accordance with an embodiment of the present invention, wherein the hosting page of FIG. 4E is displayed on a computer monitor of the user computer of FIG. 1, by a computer software web browser program stored in computer memory of the user computer and executed by a computer processor of the user computer;

FIG. 4F shows a website home page displayed with a cut-off on left side on a computer monitor of a visitor computer of FIG. 1, in accordance with an embodiment of the present invention, wherein the website home page of FIG. 4F is displayed on a computer monitor of the visitor computer of FIG. 1, by a computer software web browser program stored in computer memory of the visitor computer and executed by a computer processor of the visitor computer;

FIG. 5D shows a website secondary page displayed on a computer monitor of a visitor computer of FIG. 1 with a dislocated content box in both horizontal and vertical directions, in accordance with an embodiment of the present invention, wherein the website secondary page of FIG. 5D is displayed on a computer monitor of the visitor computer of FIG. 1, by a computer software web browser program stored in computer memory of the visitor computer and executed by a computer processor of the visitor computer;

FIG. 5F shows a website secondary page displayed on a computer monitor of the visitor computer of FIG. 1 with its content box overlapping on adjacent boxes on left and top, in accordance with an embodiment of the present invention, wherein the website secondary page of FIG. 5F is displayed on a computer monitor of the visitor computer of FIG. 1, by a computer software web browser program stored in computer memory of the visitor computer and executed by a computer processor of the visitor computer;

FIG. 6 shows a hosting page displayed on a computer monitor of a user computer of FIG. 1, comprising a set of control buttons, a webmail form template, and a set of hidden boxes, in accordance with an embodiment of the present invention, wherein the web page of FIG. 6 is displayed on a computer monitor of the user computer of FIG. 1, by a computer software web browser program stored in computer memory of the user computer and executed by a computer processor of the user computer;

FIG. 11 shows a hosting page displayed on a computer monitor of the user computer of FIG. 1, comprising a list of selectable RSS feeds available on a server computer, wherein the web page of FIG. 11 is displayed on a computer monitor of the user computer of FIG. 1, by a computer software web browser program stored in computer memory of the user computer and executed by a computer processor of the user computer.

FIG. 12 shows a flow chart of steps involved in a prior art process of hosting a web page by a user of the prior art system described in U.S. Pat. No. 7,610,219 to Sayed; and FIGS. 13A-B show a flow chart of steps involved in a method, system, and apparatus in accordance with one or more embodiments of the present invention.

DETAILED DESCRIPTION OF THE DRAWINGS

Figure 1:
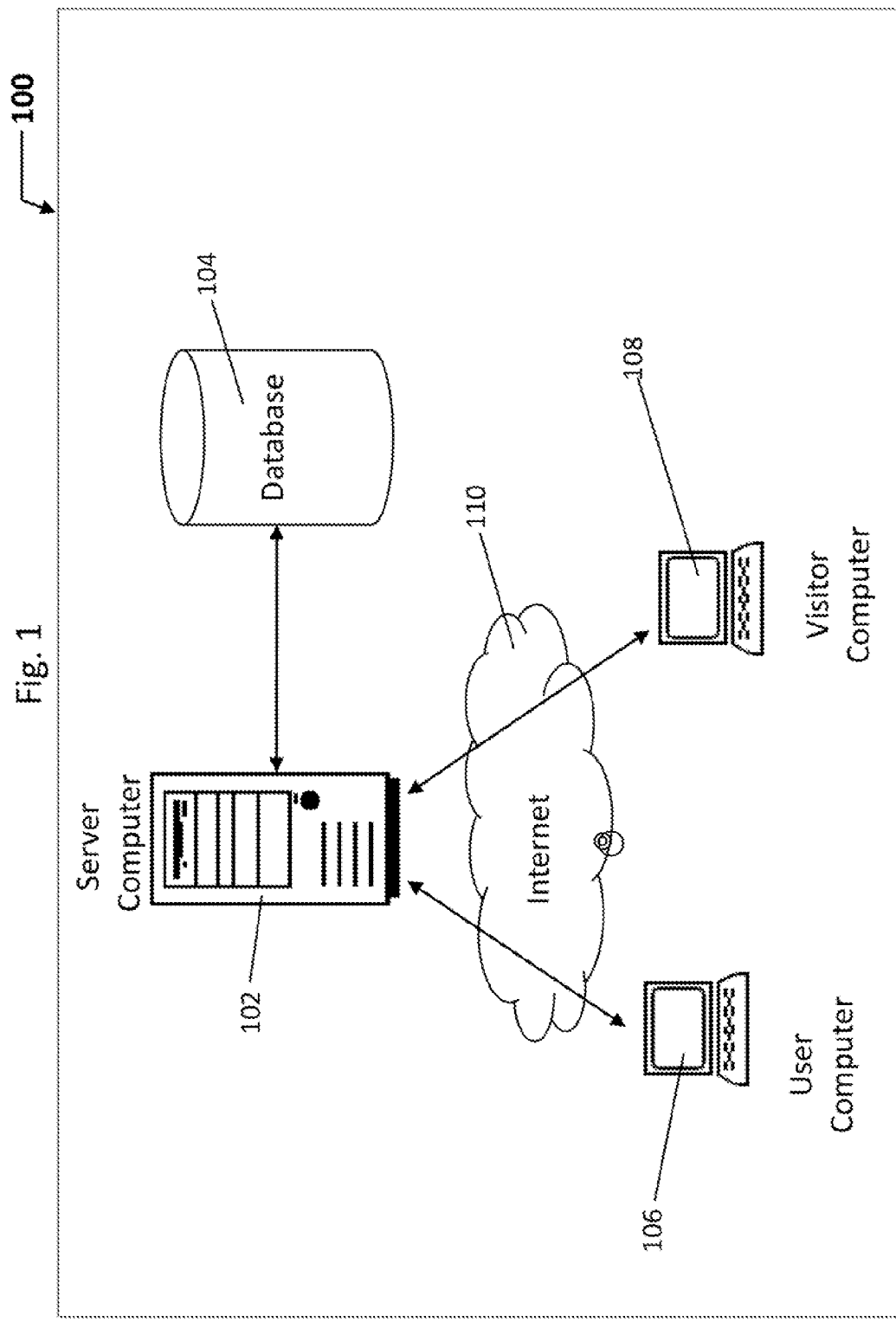
FIG. 1 shows an apparatus for use with an embodiment of the present invention.

FIG. 1 shows an apparatus 100 for use in accordance with an embodiment of the present invention. The apparatus 100 may include a server computer 102, a database 104, a user computer 106, and a visitor computer 108. The database 104 may be a computer memory which is part of the server computer 102. The user computer 106 and the visitor computer 108 may communicate with the server computer 102 through the Internet 110. The server computer 102 may interact with the database 104 via a communications link.

The user computer 106 may be a personal computer on which is located a computer software including an internet web browser computer software program. The user computer 106 typically may include a computer interactive device including a computer mouse and a computer keyboard, a computer memory, a computer processor, and a computer monitor or display. The computer processor of the user computer 106 may execute computer software, stored in computer memory of the user computer 106, including an internet web browser computer software program, such as Internet Explorer (trademarked).

The visitor computer 108 may be a personal computer on which is located a computer software including an internet web browser computer software program. The visitor computer 108 may include a computer interactive device including a computer mouse and a computer keyboard, a computer memory, a computer processor, and a computer monitor or display. The computer processor of the visitor computer 108 may execute computer software, stored in computer memory of the visitor computer 108, including an internet web browser computer software program, such as Internet Explorer (trademarked).

Figure 2:
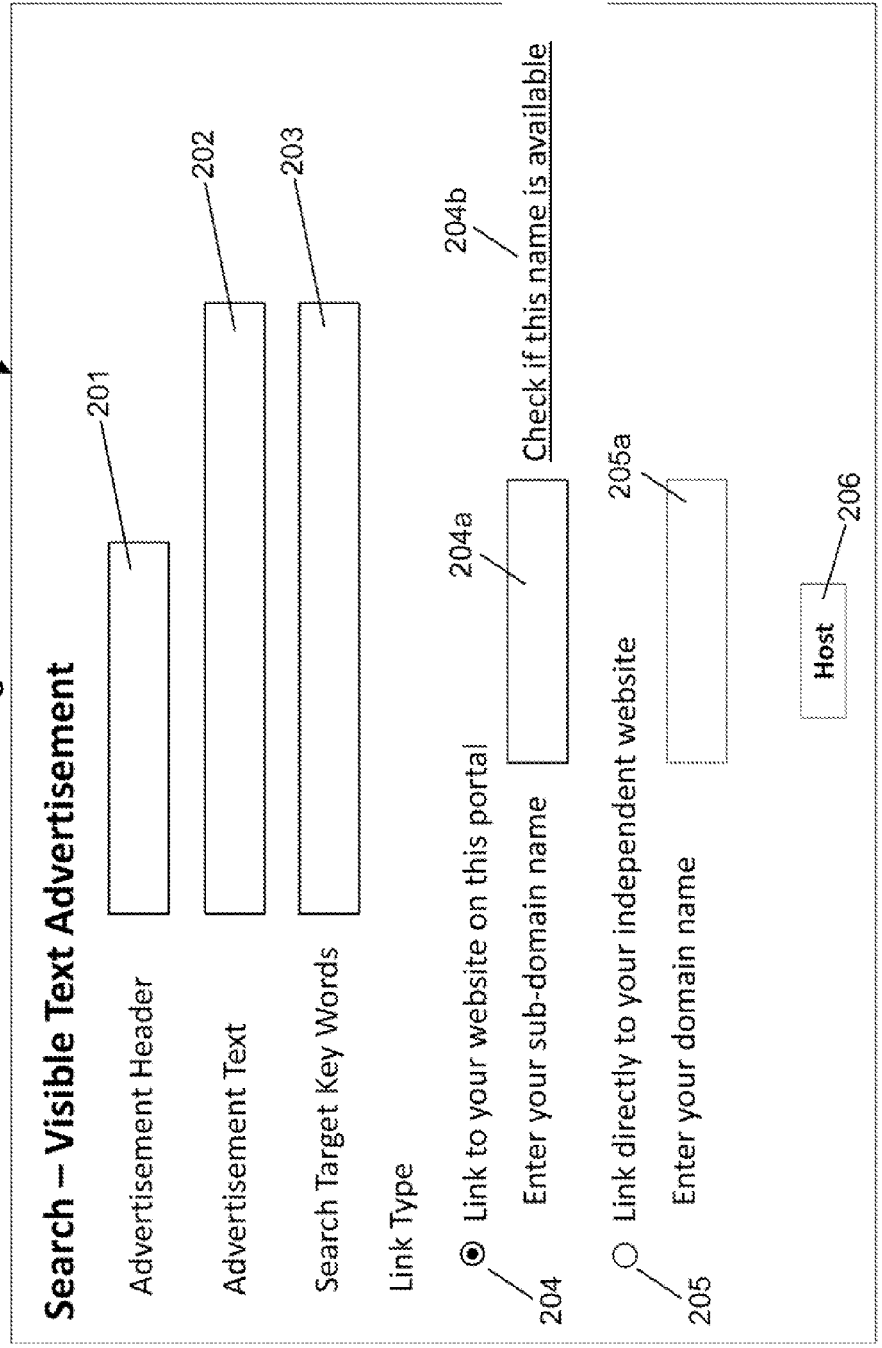
FIG. 2 shows a web page for hosting a search-visible text advertisement that will be visible on a search through a search engine and links to a website, wherein the web page of FIG. 2 will be displayed on the user computer of FIG. 1 by a computer processor executing computer software web browser program stored in computer memory of the user computer of FIG. 1.

FIG. 2 shows a web page 200, which can be displayed on a computer monitor of the user computer 106 in accordance with an embodiment of the present invention. The web page 200 may be stored on the server computer 102, and can be displayed on the user computer 106 when a user logs via the internet into a web application, typically on a web site or portal, of a system in accordance with an embodiment of the present invention, and clicks, using a computer mouse of the user computer 106, a link named "Host Your Advertisement & Website", in a web page displayed on a computer monitor of the user computer 106 which may be downloaded from the server computer 102 after login.

The server computer 102 includes a computer processor and computer memory. The server computer 102 runs computer software which is stored in its computer memory, which implements a web application or web site which provides the web page 200 shown in FIG. 2, to the user computer 106 via the internet.

Web page 200 comprises input boxes 201, 202, and 203 for entering advertisement header, full text, and search target key words respectively. Items 204 and 205 together represent a radio button with two options, one for linking the advertisement to a website that will be hosted on a sub-domain on the portal of a system in accordance with an embodiment of the present invention, and another for linking the advertisement directly to an independent website on a separate domain. When the first option is selected, an input box 204a will open on the computer monitor of the user computer 106 for entering a sub-domain name, where a user wishes to host his or her website. Also, a hyperlink 204b will be visible beside the input box 204a for checking if the entered sub-domain name is available on the portal and not already taken. When the second option 205 is selected, an input box 205a will be open on the computer monitor of the user computer 106, for entering an independent domain name to which the user wishes to link his or her advertisement. Once the form is filled, the user may click the "Host" button 206, using a computer mouse of the user computer in order to host his or her advertisement.

Figure 3:
FIG. 3 shows a web page comprising a message of advertisement hosting and a button to enable hosting of a website that will be linked by the advertisement, wherein the web page of FIG. 3 will be displayed on the user computer of FIG. 1 by a computer processor executing computer software web browser program stored in computer memory of the user computer of FIG. 1.

FIG. 3 shows a web page 300, which can be displayed on a user computer 106 in accordance with an embodiment of the present invention. The web page 300 may be stored on the server computer 102, and can be displayed on a user computer 106 when a user clicks the "Host" button 206 of web page 200. Web page 300 comprises a message reading "Your advertisement has been hosted. Please click the following button to host your website.". Web page 300 also comprises a "Go" button 301 that will open a hosting page including a "Home Page" template for hosting a website. The server computer 102 may be programmed with computer software to retrieve the web site page 300 from computer memory of the server computer 102 in response to a particular signal provided to the server computer 102 via the internet from the user computer 106. The particular signal may be generated by the user clicking the "Host" button 206 on a computer monitor of the user computer 106.

FIG. 4A shows a hosting page 400A, which can be displayed on a computer monitor of the user computer 106 in accordance with an embodiment of the present invention. The hosting page 400A may be stored on the server computer 102, and can be displayed on the user computer 106 when a user clicks the "Go" button 301 of web page 300. The server computer 102 is programmed by computer software to transmit the web page 400A to the user computer 106 in response to a signal generated by the user clicking on the "Go" button 301 on a computer monitor of the user computer 106 using a computer interactive device of the user computer 106.

The hosting page 400A provides a "Home Page" template of a website that a user wishes to host. The hosting page 400A comprises a set of control buttons 401-478 to modify the "Home Page" template, a cross-hairs 480, a set of visible boxes 482, 484a-k, 486, 488a-i, 490, 491, 492, 493, and 494, which together may be thought of as the "Home Page" template 481 in at least one embodiment, a "Host" button 495, and a set of hidden boxes 496a-496j wherein the content and attributes of all visible boxes are written when the "Host" button 495 is clicked. There can be more hidden boxes in the hosting page depending on the number of visible boxes. A template web page computer code file for the hosting page 400A may include code representing all aspects of the hosting page 400A including the control buttons 401-478, visible boxes or items 482, 484*a-k*, 486, 488*a-i*, 490, 491, 492, 493, and 494, "Host" button 495, and hidden boxes or fields 496*a-j*.

Control buttons 401-478 enable a user to control various attributes of the visible boxes 482, 484*a-k*, 486, 488*a-i*, 490, 491, 492, 493, and 494 (hereinafter "Home Page" template 481) such as location, size, fonts, colors, borders. Each button in the set of control buttons 401-478 represents a particular attribute. In order to define an attribute of any one of the visible boxes of the "Home Page" template 481, a user should keep a cursor 489 in that particular visible box and click the control button that represents the attribute, using a computer mouse of the user computer 106. The cursor 489 is the "text cursor" that typically is a vertical line that flashes on and off and that can be placed in a box by clicking on it with a computer mouse of the user computer 106. The cursor or text cursor 489, differs from an arrow pointer such as arrow pointer 499 shown in FIG. 4A. The cursor 489 is the "text cursor" or "typing cursor" that we see as a vertical line flashing on and off in an input box when we click on it with a computer mouse. The cursor 489 can be referred to as the "text cursor", "keyboard cursor", "edit cursor", "typing cursor", and "blinking cursor". The arrow mark, arrow pointer, or mouse pointer 499 shown in FIG. 4A, that moves when a computer mouse of the user computer 106 is moved is a "mouse pointer" and differs from the "cursor" 489.

Control buttons 401 and 402 represent border width and color respectively. Similarly, control buttons 403-409 represent the attributes of background color, font style, font size, font color, bold, underline and italicize, respectively. Control button 410-418 represent the same attributes of control buttons 401-409 for mouse-over effects. The attributes defined by control buttons 410-418 apply when a mouse-over action takes place on one of the visible boxes of the home page template 481.

Control button 419 enables a user via user computer 106, to link a visible box of the home page template 481 to a home page of a user's website. Control buttons 420, 421, 422, and 423 enable a user via user computer 106 to add a webmail form, registration form, forgot password form, and password reset form to a user's website, respectively. Control button 424 enables a user via user computer 106 to add a secondary web page to a user's website. Control buttons 425 and 426 enable a user via user computer 106 to add a chat box and RSS Feeds to a website, respectively. In fact, in at least one embodiment, the server computer 102 does not recognize any control buttons or actions thereof. The script functions of the hosting page itself recognize clicks on control buttons and accordingly capture the attributes defined using the control buttons, and writes the captured attributes to hidden boxes of the hosting page. When a user completes his or her page design and has no more buttons to click and no more attributes to be defined, he or she has all the attributes captured and kept in memory of the user computer 106. Then the user finally clicks the host button such as 495 of the hosting page. This click on the host button 495 will write all the captured attributes and contents to hidden boxes of the hosting page and submit the data written in hidden boxes to the server computer 102, where the data is captured and stored in the database 104. For every element such as a box, line, images etc on a template, there will be a hidden box associated with the element on the same hosting page. Whenever the attributes of an element are defined or updated, those are written to or updated in its corresponding hidden box. There is a number mapping between the design elements and the hidden boxes, from which the server computer 102 identifies the attributes captured from a hidden box as belonging to a particular design element such as a box, line, or image etc, and appropriately inserts the attributes into the database 104 as a record with an identification key. The attributes of every design element are written to a single hidden box, separated with a delimiter such as a comma or semicolon.

Control buttons 431-434 represent quick translational motions of any one of the visible boxes of the "Home page template" 481, while control buttons 435-438 represent quick resizing of any one of the visible boxes or visible items such as visible items 482, 484*a-k*, 486, 488*a-i*, 490, 491, 492, 493, and 494 shown in FIG. 4A of the "Home page template" 481. Quick translational motion moves a visible box or item by two or more pixels at a time while quick resizing resizes a visible box or item by two or more pixels at a time. For example, control buttons 431 and 432 enable a user to quickly move any one of the visible boxes of the Home Page Template 481 horizontally in the right and left directions respectively, so these can be positioned differently in a web page stored in the database 104 by server computer 102 and available for access by a visitor computer 108. Similarly, control buttons 433 and 434 enable users, by using user computer 106, to quickly move a visible box vertically upward and downward respectively. Control buttons 435 and 436 enable users to quickly increase and decrease the width of a visible box respectively. Similarly, buttons 437 and 438 enable users to quickly increase and decrease the height of a visible box respectively. All the above effects take place on a focused visible box (the visible box that currently holds the cursor), in at least one embodiment. In order to apply any of these effects on a visible box, a user should place the cursor 489, using a computer mouse of the user computer, in that particular visible box, then place the mouse pointer 499, using a computer mouse of the user computer shown in FIG. 4A, over the relevant control button and keep the user computer mouse left button down until the desired location or size is reached.

Control buttons 439-442 represent slow translational motion of a visible box of the Home Page template 481 while control buttons 443-446 represent slow resizing. Slow translational motion moves a visible box or item by one pixel while slow resizing resizes a visible box or item by one pixel. For example, control buttons 439 and 440 enable a user to slowly move a visible box horizontally in the right and left directions respectively. Similarly, control buttons 441 and 442 enable a user to slowly move a visible box vertically upward and downward respectively. Control buttons 443 and 444 enable a user to slowly increase and decrease the width of a visible box respectively. Similarly, control buttons 445 and 446 enable a user to slowly increase and decrease the height of a visible box, respectively. In order to apply any of these effects on a visible box, a user should place the cursor 489 using a computer keyboard or computer mouse of the user computer 106 in that particular visible box and then click the relevant control button once using the mouse pointer 499 operated by a computer mouse of the user computer 106. This will move or resize the particular visible box of the "Home page" template 481 by one pixel. The click action should be continued until the desired location or size is reached. Slow motion and resizing of boxes is useful in fine aligning and fine sizing of a visible box once rough aligning and sizing is achieved using the quick motion and resizing control buttons, which will considerably save time during the home page design. Control buttons 431-446 can also be used to move and resize other visible items such as lines and images. In order to achieve the desired effect of any control button on a line or image, a user should first click on the line or image and then click the relevant control button.

Control buttons 447, 448 and 449 enable a user by use of user computer 106 to add more visible boxes or remove existing visible boxes of visible items 482, 484*a*-*k*, 486, 488*a*-*i*, 490, 491, 492, 493, and 494 shown in FIG. 4A from the home page template 481. While control button 448 enables to add a new visible box, control button 449 enables to remove an existing visible box from the home page template. Radio button 447 decides the local or global presence of a box to be added or removed. A local box is displayed only on the web page it is added to, while a global box is displayed on every web page of the web site that a user hosts through the server computer 102.

Control buttons 450, 451 and 452 enable a user to add horizontal lines or remove the existing horizontal lines from the home page template 481. While control button 451 enables a user by using user computer 106 to add a horizontal line, control button 452 enables a user to remove an existing horizontal line from the home page template 481. Radio button 450 decides the local or global presence of a horizontal line to be added or removed. A local horizontal line is displayed only on the web page it is added to, whereas a global horizontal line is displayed on every web page of the web site that a user hosts.

Control buttons 453, 454 and 455 enable a user through user computer 106 to add or remove images from the home page template 481. While control button 454 enables a user to add an image, control button 455 enables a user to remove an existing image from home page template. Radio button 453 decides the local or global presence of an image to be added or removed. A local image is displayed only on the web page it is added to while a global image is displayed on every web page of the web site that a user hosts.

Control buttons 461, 462, and 463 enable a user to set the font type, font size, and font color of a selected text portion of a visible box of the home page template 481. Similarly, control buttons 464, 465, and 466 enable a user to set the Bold, Underline, and Italicize attributes of a selected text portion of a visible box. The functionality of control buttons 461-466 differ from that of 404-409 in that while control buttons 461-466 enable a user to apply font effects on a selected portion of a text, control buttons 404-409 apply the font effects over the entire text of a visible box.

Control buttons 468 and 469 respectively impart a right and left tab to a selected paragraph of a visible box of the home page template 481. Similarly, control buttons 470, 471, and 472 respectively enable a user to align text in a visible box to the left, center, and right.

Items 473, 474 and 475 are control buttons that enable a user to provide a hyperlink to a URL on the Internet from a text string, box and image on the user's website which is being created, respectively. In order to provide a hyperlink from a text string, a user should highlight the text string with a computer mouse of the user computer 106 and click the control button 473 with the mouse pointer 499, which will open a dialog box for defining the URL to be hyperlinked. Once a hyperlink is defined, a hyperlink tag will be added to the highlighted text string in html code of the box containing the text string. A box may be hyperlinked to a URL on the Internet by keeping the cursor 489 in the box and clicking the control button 474 with the mouse pointer 499 operated by a computer mouse of the user computer 106, which will open a dialog box for defining the URL to be hyperlinked. Once the hyperlink is defined, a hyperlink tag will be added to the box in html code of the web page which will be stored in the database 104 by the server computer 102. Similarly, an image may be hyperlinked to a URL on the Internet by clicking the image followed by a click on the control button 475, which will open a dialog box for defining the URL to be hyperlinked. Once the hyperlink is defined, a hyperlink tag will be added to the image tag in html code of the web page.

Items 476 and 477 are control buttons that enable a user to provide a hyperlink to a secondary page to be added to the user's created website, from a text string and image respectively. In order to provide a hyperlink to a secondary page from a text string, a user should highlight the text string with a computer mouse and click the control button 476 using the mouse pointer 499 operated by a computer mouse of the user computer 106, which will add a hyperlink tag to the highlighted text string in html code of the present page and open a hosting page including a secondary web page template. The secondary web page template may be modified and filled with content as required and hosted by clicking, using the mouse pointer 499 moved by a computer mouse of the user computer 106, the Host button 495 of the hosting page. Similarly, in order to provide a hyperlink to a secondary web page from an image, a user should click the image followed by a click on the control button 477, which will add a hyperlink tag to the image tag in html code of the present page and open a hosting page including a secondary web page template. The secondary web page template may be modified and filled with content as required and hosted by clicking the Host button, such as 495 of the hosting page.

Item 478 is a control button that enables a user to add a Marquee tag to a web page, which will be stored in database 104 by the server computer. Typically, in at least one embodiment, the web page will not be stored in the database 104. Typically, in at least one embodiment, only the details or attributes such as location, dimension, color, border, content etc of its items such as boxes, lines, images etc will be stored in the database 104. A Marquee tag is also treated as an attribute of a box it is added to. A click, by a user through user computer 106, on the control button 478 will add a borderless box, wherein a text string for a Marquee tag can be defined. Once a Marquee string is defined in the borderless box, a Marquee tag is added to the text string in html code of the page.

Item 480 is a cross-hairs representing the (0,0) coordinates or the top left corner vertex of a web browser's display area 442B of FIG. 4B wherein a website web page is displayed. In at least one embodiment, cross-hairs 480 is fixed at its location and can not be moved using any of the control buttons. The cross-hairs 480 will typically not appear in the actual home web page that a visitor visits on a website. The cross-hairs 480 includes a vertical line 480*a* and a horizontal line 480*b* as shown in FIG. 4A. The left edges of boxes 482, 484*a*, and 486 should be aligned with the vertical line 480*a*, and the top edge of box 482 should be aligned with the horizontal line 480*b* in order to have a home page whose top and left edges align with the top and left edges of a web browser's display area 442B as shown in FIG. 4B on a visitor's computer 108. Item 441B of image 400B in FIG. 4B is non-display area on a computer monitor of the visitor computer 108 produced by a visitor's web browser computer software running on a computer processor of the visitor computer 108. The non-display area 441B is comprised of the browser's own icons, URL box, tool bar etc.

The set of visible boxes 482, 484*a*-*k*, 486, 488*a*-*i*, 490, 491, 492, 493, and 494 collectively referred as 481 constitutes a template for the website home page that a user wishes to host without any coding and without any file uploading to the server computer 102. "Without any file uploading" means that in at least one embodiment, no concrete files are uploaded such as HTML, JSP, ASP, PHP files through a File Transfer Protocol using an FTP (File Transfer Protocol) tool. However, in at least one embodiment, all data is transmitted to server computer 102 just through the Hypertext Transfer Protocol only through form submissions. Item 482 is a header box for the website home page, while items 484a-484k are a set of horizontally arranged boxes that may link to other web pages of the website. More boxes can be added after 484k if required by clicking the control button 448, while existing boxes can be removed in the reverse order of their addition by clicking the control button 449. The newly created boxes are located at a default position with a default size specified by the script code of the hosting page of FIG. 4A. The script code is a part of the hosting page. While the hosting page is stored on computer memory of the server computer 102, the script code of the hosting page is downloaded to the user computer 106 as part of the hosting page, or template web page computer code file, when the user accesses the hosting page to design and host his or her web page. (Note: Typically, the script code is not downloaded separately, It is part and parcel of the hosting page or template web page computer code file. When the user accesses the hosting page or template web page computer code file, the hosting page is downloaded along with its script code to the user computer 106 and loaded into the browser and a template web page display is displayed on the user computer monitor.) Hence, when a user clicks any control button on the hosting page, using user computer 106, the relevant script code of the hosting page is executed by the web browser computer software program in computer memory of the user computer 106. In at least one embodiment of the present invention, the server computer 102, does not execute any script codes of the hosting page. The server computer 102, in at least one embodiment, supplies a hosting page to a user computer 106 and the server computer 102 receives attributes from the user computer 106 of the web page designed using the hosting page when the user clicks host button 495. The script code of the hosting page brings new boxes into existence at specified locations with specified sizes. A user through user computer 106, can relocate and resize the newly added boxes to desired position and size using the control buttons 431-446. Also, their attributes such as fonts, borders, colors, tabs, text alignment and mouse-over effects can be redefined using the control buttons 401-418, and 461-472. A user may type a word or text he or she likes in these boxes.

Item 486 is a background box for items 488a-488i and may be used for defining a background color, border and header for these items. Items 488a-488i are a set of vertically arranged boxes that may link to other web pages on the user created website. More boxes can be created or existing boxes can be deleted if required using the control buttons 448 and 449. The newly created boxes are located at a default position with a default size specified by the script code of the hosting page of FIG. 4A on the user computer 106. The script code of the hosting page brings new boxes into existence at specified locations with specified sizes. When a user, via user computer 106, clicks any control button on the hosting page, the relevant script code of the hosting page is executed by the web browser on the user computer 106. In at least one embodiment, the server computer 102 does not execute any scripts relating to the hosting page. The server computer 102, in at least one embodiment supplies a hosting page to the user computer 106 and receives attributes of the web page designed using the hosting page when the user clicks host button 495. A user can relocate and resize the newly added boxes to desired position and size using the control buttons 431-446. Also, their attributes such as fonts, borders, colors and mouse-over effects can be redefined using the control buttons 401-418. A user may type a word or text he or she likes in these boxes.

Item 490 provides the main content box for the user's website home page, wherein content can be defined in paragraphs and formatted as required using the relevant control buttons. Item 491 provides a box for defining copyright information of the website. Both the boxes 490 and 491 can be relocated, resized, and their attributes can be modified using relevant control buttons.

Item 492 provides a set of properly arranged boxes representing a login facility form that can be hosted as part of the home page without any coding, programming or file uploading to the server computer 102. Item 492 comprises a large outline box superimposed by multiple small boxes. While the outline box is used to define a border and background of the login form, the inner small boxes are used for defining labels, input boxes and a button. The labels of Login ID, Password, Register and Forgot Password are contained by visible boxes with suppressed borders. Item 492 also comprises two input boxes for login id and password and also a box for OK button. A user may change the position, size, background, fonts, colors etc of the labels, input boxes and OK button using relevant control buttons. When the Home page of a website is hosted by a user, using the user computer 106 by clicking the Host button 495 shown in FIG. 4A, which causes all the details of the home page template 481 and its content to be written to the hidden boxes 496a-j of the hosting page of FIG. 4A and immediately submitted to the server computer 102, the login box 492 is also hosted on server computer 102 as part of the home page, along with default forms for Register, Forgot Password, and Password Reset facilities. These hosted forms enable visitors to register on the website, login to accounts, request temporary passwords, and reset passwords. These hosted forms may be considered to be user facility forms.

Typically, in one embodiment nothing needs to be permanently stored on a user computer, such as user computer 106. When a user, using user computer 106, fills out and submits one or more web page templates to the server computer, any information or data is sent to the server computer 102 and stored in a database 104 on the server computer 102. Then any visitor, using a visitor computer, such as computer 108, in the world can view the user created website pages and forms. A user computer 106 is used, in at least one embodiment, only to open templates, and design web pages of a website and click the host button such as 495 to host them on the server computer 102. A computer software program stored in computer memory of the server computer 102 automatically hosts a default Register form, Forgot Password form, and Password Reset form as soon as a home page is hosted, meaning the attributes of labels 890a-b, input boxes 890c-d and OK button 890e of a default form such as the default Forgot Password form 890 shown on FIG. 8 are written to database 104 by the computer software program, without any manual intervention by a user, in at least one embodiment. However, a user can also redesign his or her Register form shown in FIG. 7, Forgot Password form shown in FIG. 8, and Password Reset form shown in FIG. 9.

Figure 7:
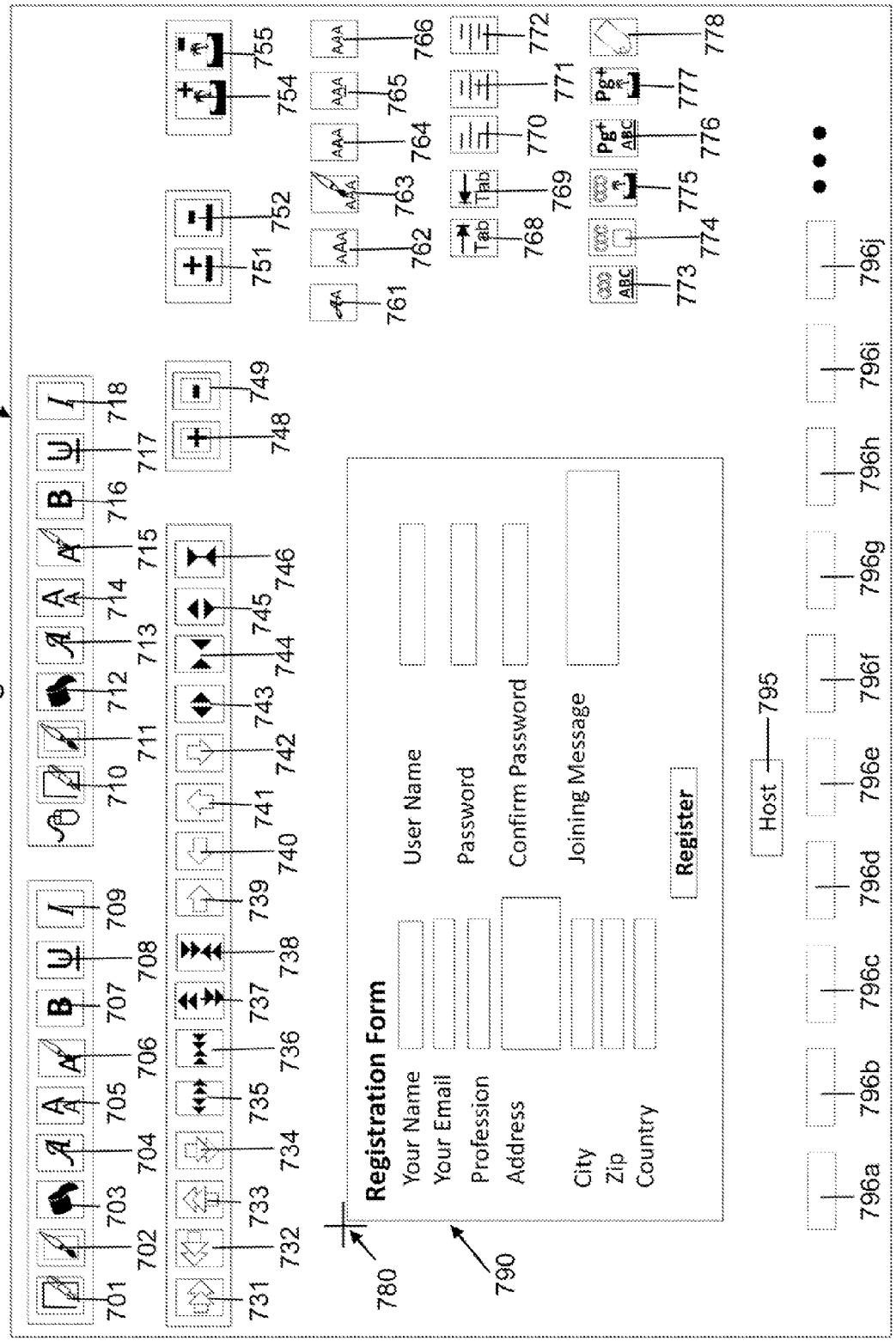
FIG. 7 shows a hosting page displayed on a computer monitor of the user computer of FIG. 1, comprising a set of control buttons, a website registration form template, and a set of hidden boxes, in accordance with an embodiment of the present invention, wherein the web page of FIG. 7 is displayed on a computer monitor of the user computer of FIG. 1, by a computer software web browser program stored in computer memory of the user computer and executed by a computer processor of the user computer.
Figure 8:
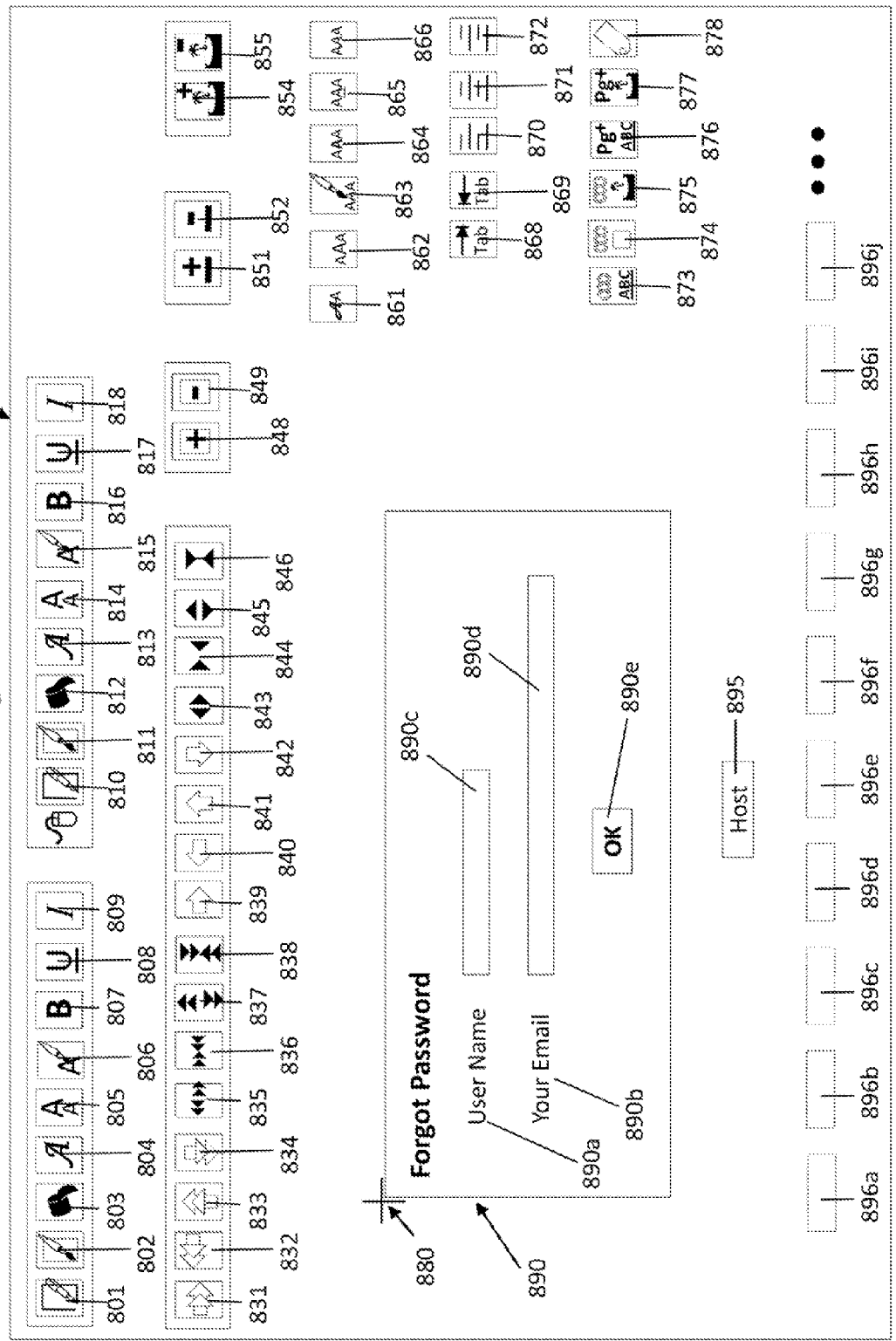
FIG. 8 shows a hosting page displayed on a computer monitor of the user computer of FIG. 1, comprising a set of control buttons, a forgot password form template, and a set of hidden boxes, in accordance with an embodiment of the present invention, wherein the web page of FIG. 8 is displayed on a computer monitor of the user computer of FIG. 1, by a computer software web browser program stored in computer memory of the user computer and executed by a computer processor of the user computer.

A hosting page 700 shown in FIG. 7 comprising a default Register form template opens when a user, through use of user computer 106, clicks the control button 421, on a computer monitor of the user computer 106, which can be redesigned for a required look and feel by changing the location, size, color, font and background of each box using the control buttons available in the hosting page 700. Similarly, a hosting page 800 shown in FIG. 8 comprising a default Forgot Password form template will open, on a computer monitor of the user computer 106, when a user clicks the control button 422, which can be redesigned for a required look and feel by changing the location, size, color, font and background of each box using the control buttons available in the hosting page 800. Also, a hosting page 900 shown in FIG. 9 comprising a default Password Reset form template will open, on a computer monitor of the user computer 106, when a user clicks the control button 423, which can be redesigned for a required look and feel by changing the location, size, color, font and background of each box using the control buttons available in the hosting page 900. All attributes of the visible boxes of Login, Register, Forgot Password and Password Reset forms are written to hidden boxes available in their respective hosting pages and submitted to the server computer 102 when the respective Host buttons 495, 795, 895, and 995 are clicked using a computer mouse of the user computer 106, where they are stored in a database, such as database 104.

When a visitor, such as a visitor using visitor computer 108 in FIG. 1, visits a website home page, the login form is displayed as part of it. When a visitor clicks (using a computer mouse of the visitor computer 108) a link in the login form that points to one of these form pages, the server computer 102 retrieves all the attributes of the form page from database 104 and passes them to the visitor's visitor computer such as 108, where the web browser computer software program running on the visitor computer 108 constructs and displays the web page comprising that particular form.

"Hosting" a web site in a general sense, and as referred to in this application means making a website or web page accessible to the public via the world wide web. A user computer, such as 106, hosts a web site by making the web site or web pages available to the public from the server computer 102. But the user computer 106 does not supply web pages directly to the visitor computer 108. By sending some attributes to the server computer 102, where they are stored in a database 104, the user computer 106 is not uploading any concrete files of web pages, in at least one embodiment, but a user is "hosting" his or her web site by making a web site accessible (via the server computer 102) to the public. While a user hosts his or her website, visitors visit the website.

Item 493 provides a set of boxes representing a Subscribe facility form that can be hosted as part of the home page without any coding, programming or file uploading. In at least one embodiment, there are no files that need to be uploaded and stored on a server computer through the File Transfer Protocol using an FTP tool. Only the attributes of the boxes, such as those of template 481, and other items of the hosting page, such as 400A of FIG. 4A, are submitted to the server computer 102 through the HTTP (Hypertext Transfer Protocol), by clicking the host button such as 495 of the hosting page on the user computer 106. The server computer 102 receives the attributes and stores them in a database record in the database 104 against the Page ID (identification). Item 493 comprises a large outline box superimposed by multiple small boxes. While the outline box is used to define a border and background of the Subscribe form, small boxes with suppressed border are used for defining labels such as Subscribe, and Email. Item 493 also provides two small boxes, one for Go button, and another for email input. A user may change the position, size, background, font, color etc of the labels, input box and Go button using the relevant control buttons. When the Home page of a website is hosted by clicking the Host button 495, the Subscribe form 493 is also hosted automatically as part of the home page, which enables the website visitors to subscribe themselves on the website to receive emails from the website. As soon as the Host button 495 of hosting page 400A is clicked, all attributes of the Subscribe form boxes are written to some hidden boxes of the hosting page 400A and immediately submitted to the server computer 102, where they are stored in the database 104. When someone visits the website, the server computer 102 retrieves all the attributes from the database 104 and passes them to the visitor's computer 108, where the web browser computer software program of the visitor's computer 108 running on a computer processor and stored in computer memory of the visitor's computer 108 constructs and displays the form as part of the user's created home page.

Item 494 provides a set of boxes representing a "Send This Page" facility that can be hosted automatically as part of the home page without any coding, programming or file uploading. The attributes of the boxes of Send This Page form are also written to some hidden boxes of the hosting page 400A and submitted to the server computer 102 when the host button 495 is clicked. Item 494 comprises a large outline box superimposed by multiple small boxes. While the outline box is used to define a border and background of the "Send This Page" form, the two small input boxes are used for "Recipient's Email" and "Your Name". Item 494 also provides a small box for Send button. A user may change the position, size, background, font, color etc of the label, input boxes and the Send button of item 494 using the relevant control buttons. When the Home page of the website is hosted by clicking the Host button, the "Send This Page" form 494 is also hosted automatically as part of the home page, which enables the website visitors to send the web page to others. As soon as the Host button 495 of hosting page 400A is clicked, all attributes of the "Send This Page" form are written to hidden boxes of the hosting 400A and immediately submitted to the server computer 102, where they are stored in a database 104. When someone visits the website, the server computer 102 retrieves all the attributes from the database 104 and passes them to the particular visitor's computer, such as visitor's computer 108, where the particular visitor's web browser computer software constructs and displays the form as part of the Home page on a computer monitor of the visitor computer 108.

Item 420 is a control button that enables a user to add a webmail form to a website and link it to a box on the home page. In order to add a webmail form page and link it to a box on home page, a user should keep the cursor of a computer interactive device of the user computer 106 in that particular box and click, using a computer mouse of the computer interactive device of the user computer 106, the control button 420. This action will open a hosting page 600 of FIG. 6 with a default webmail form template in design mode, which can be redesigned for the required look and feel using the control buttons available in the hosting page of the webmail form template. Once the design is complete, a user may host the webmail form by clicking the Host button 695 of the webmail form hosting page.

Throughout this document, typically in at least one embodiment, "hosting" means writing the attributes and content of all boxes 482, 484*a-k*, 486, 488*a-i*, 490-494 of the template 481 shown in FIG. 4A to hidden boxes 496*a-j*, which are part of the hosting page, and submitting them to the server computer 102 and then storing them in a database 104 of the server computer 102.

All attributes of the webmail form are written to hidden boxes of the webmail form hosting page and submitted to the server computer 102 when the Host button 695 is clicked. The server computer 102 stores the attributes in a database 104. Also, when a user hosts the web mail page, the link information between the webmail page and its associated box on the home page is submitted to the server computer 102, where it is stored in the database 104. When a visitor visits the website home page, the link information is retrieved from the database 104 and interpreted in the Home page as a hyperlink between the relevant box and the webmail form. When a visitor, by use of visitor computer 108, clicks the box linked to the webmail form, the server computer 102 retrieves all attributes of the webmail form from the database 104 and passes them to the visitor's computer 108, and the visitor's computer 108 uses the attributes of the webmail passed to it from the server computer 102 to cause the display of the webmail form on a computer monitor of the visitor's computer 108. The webmail form can then be used by the visitor using the visitor computer 108 for sending email to the website.

Item 424 is a control button that enables a user to add a secondary webpage to the website and link it to a box on the home page. In order to add a secondary web page, a user should keep the cursor in the box that should be linked to the secondary web page and click the control button 424, using user computer 106. This action will open a hosting page 500A of FIG. 5A comprising a secondary web page template, a set of hidden boxes, and control buttons for defining attributes of boxes, such as color, font, border, location and size. The base template of secondary web page comprises only one visible box that can be used for defining the page content. However, a user may add more boxes, images, and horizontal lines, if required. Once the secondary web page design is complete, a user can fill in the content, format it and host the web page by clicking the Host button 595 of the hosting page 500A of FIG. 5A. When a user hosts a secondary web page, all attributes and content of the web page are written to the hidden boxes of the hosting page 500A and immediately submitted to the server computer 102, where they are stored in the database 104. When a visitor visits the web site, using a visitor's computer, such as visitor computer 108, and clicks, using a computer mouse of the visitor computer 108, the box that links to the secondary web page, the server computer 102 retrieves all attributes of the secondary web page from the database 104 and passes them to the visitor's computer 108, and the visitor's computer 108 uses the attributes of the secondary web page passed to it to display the secondary web page on a computer monitor of the visitor's computer 108. This way, any number of secondary web pages can be added and linked to boxes of the home page. The link information between the boxes and the secondary web pages is written to hidden boxes of the hosting pages of the respective secondary web pages and submitted to the server computer 102 when the secondary web pages are hosted. When a visitor visits the website home page using visitor computer 108, all the links are presented in the home page code as hyperlinks from the boxes to their corresponding secondary web pages of the website.

Item 425 is a control button that enables a user to add a chat facility to a website through which visitors can chat with a website operator. In order to add a chat facility to a website, a user should click the control button 425, by using user computer 106. This action will display a menu of images from which the user may select one through a mouse click, which will appear on the website's home page and links to the chat box. Once an image is selected, a hosting page 1000 of FIG. 10 will open in a new window comprising a set of control buttons, a set of non-modifiable input boxes, a chat box template, and a set of hidden boxes. A user may fill in the non-modifiable input boxes with the nick names of operators who will chat with visitors. The chat box template may be redesigned using the control buttons of the hosting page 1000 and may be hosted by a user by clicking, using a computer mouse of a computer interactive device of the user computer 106, the Host button 1095 of the hosting page 1000 of FIG. 10. The chat image added to the home page can be relocated to a suitable place using the relevant control buttons of the hosting page 400A of FIG. 4A.

Item 426 is a control button that enables a user, by use of the user computer 106, to add RSS Feeds to a user created website. In order to add RSS Feeds to a website, a user needs to keep the cursor in a box that should be linked to RSS Feeds and click the button 426 using a computer mouse of the user computer 106, which will open a web page 1100 of FIG. 11 on the user computer 106 with a listing of the RSS feeds available on the server computer 102, out of which a user can select the required ones, using user computer 106. When the OK button 1195 of image 1100 in FIG. 11 (RSS Feeds Listing Page) is clicked by use of user computer 106, the information of the selected RSS feeds is stored in hidden boxes of the web page and submitted to the server computer 102, where it is stored in the database 104. When a visitor visits the user created website and clicks, using a computer mouse of the visitor computer 108, the box linking to RSS Feeds, the server computer 102 retrieves and passes the information of all the selected RSS Feeds to the visitor computer 108, where it is displayed on the visitor computer 108 as a web page with links to the selected RSS feeds. When a visitor visits the home page of the user created website, using the visitor computer 108, the server computer 102 retrieves the link information that links a home page item to the RSS Feeds page from the database 104 and passes it to the visitor computer 108, where it is interpreted as a hyperlink in the source code of home page.

Host button 495 is used to host the home page of a website as shown in the hosting page 400A of FIG. 4A. When a user clicks the Host button 495, using the mouse pointer 499 controlled by a computer mouse of the user computer 106, all attributes, content and links of the visible boxes, horizontal lines, and images etc are written to the hidden boxes 496a-496j and immediately submitted to the server computer 102, where they are stored in a database 104. When a visitor visits the user created website by typing its URL in a browser computer software screen of the visitor computer 108, or by clicking an advertisement, displayed on a computer monitor of the visitor computer 108, that links to the user created website, the server computer 102 retrieves all the attributes and passes them to the visitor computer 108, where the home page is displayed on a computer monitor of the visitor computer 108 by a computer software program browser running on a computer processor of the visitor computer 108.

FIG. 4B shows a website home page 443B displayed in an image 400B of a web browser of the visitor computer 108. The website home page 443B is shown without various content for clarity of FIG. 4B. Item 441B is a non-display area of the image 400B of the web browser, which would typically include the web browser's own icons, URL box, menu bar etc. Item 442B is a display area of the image 400B of the web browser wherein a website is displayed. A web site home page 443B is displayed in the display area 442B of the image 400B of the web browser. The website home page 443B is aligned with the top and left edges of the web browser's display area 442B. Such a display of a home page can be achieved by hosting the home page 443B using a template 481, whose top-left corner vertex coincides with the intersection point of cross-hairs 480 as shown in hosting page 400A of FIG. 4A.

Figure 4C:
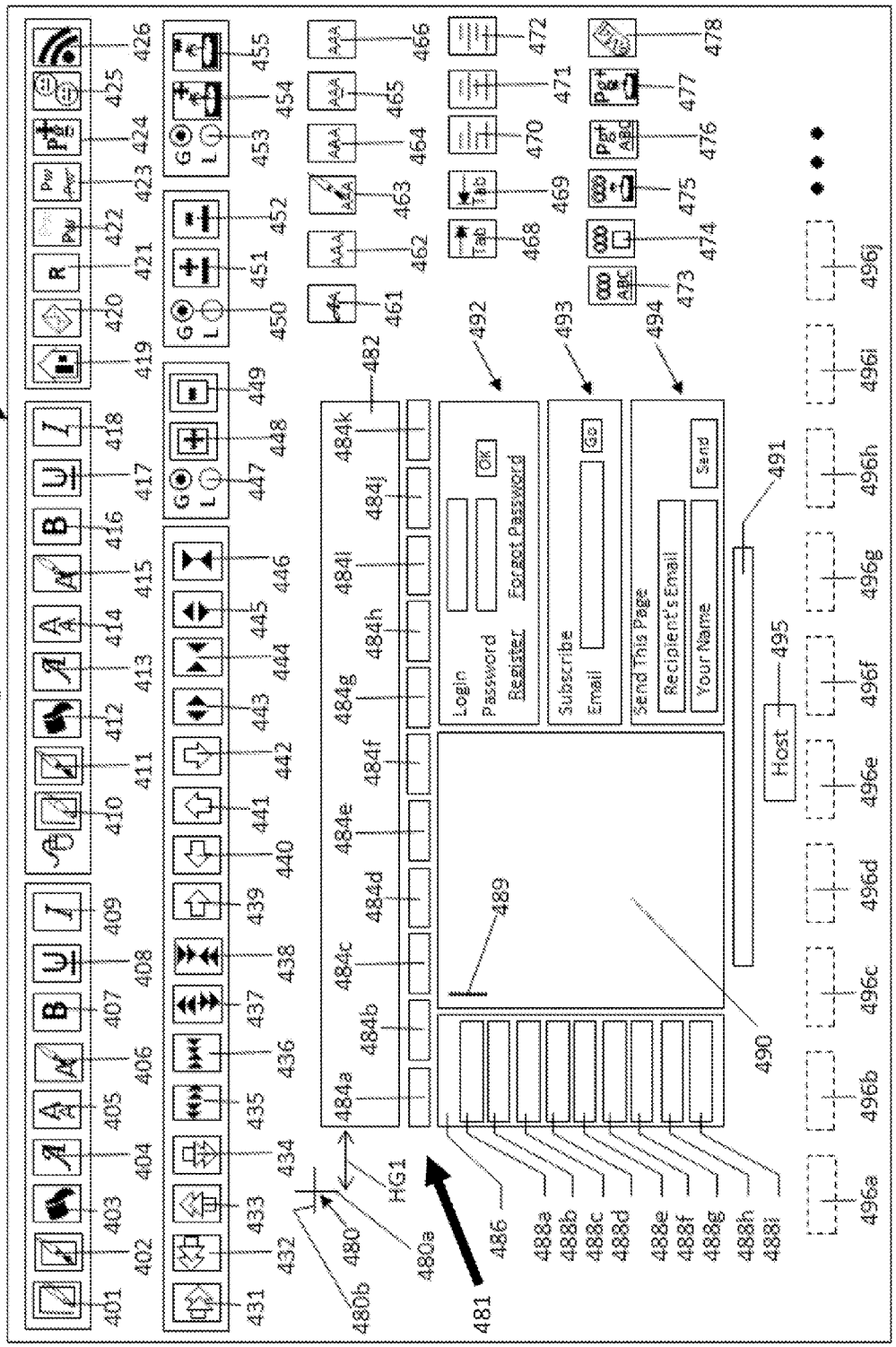
FIG. 4C shows a hosting page including a website home page template shifted away from cross-hairs in horizontal direction, in accordance with an embodiment of the present invention, wherein the hosting page of FIG. 4C is displayed on a computer monitor of the user computer of FIG. 1, by the user computer and executed by a computer processor of the user computer.

FIG. 4C shows a hosting page 400C, which includes a website home page template 481 shifted off the cross-hairs 480 in a horizontal direction from the position shown in FIG. 4A. Cross-hairs 480 is comprised of a vertical line 480a and a horizontal line 480b whose intersection point represents the top, left corner vertex of a browser's display area on a visitor's computer, such as 108. The website home page template 481 is shifted as a whole off the cross-hairs vertical line 480a by a distance of HG1. A website home page hosted with such a positional arrangement of the template 481 in a hosting page 400C is displayed with the same shift HG1 from the browser's left edge on the visitor's computer, such as the visitor computer 108, as shown FIG. 4D. Item 492, in one embodiment, typically refers only to the Login form box which is only a part of the template 481, and typically doesn't refer to the entire template. Items 482, 484a-k 486, 488a-i, 490, 491, 492, 493, 494, in one embodiment, together constitute the entire template 481. The hosting page 400C is comprised of the control buttons 401-478, cross-hairs 480, home page template 481, host button 495 and hidden boxes 496a-496j.

FIG. 4D shows a website home page 443D displayed with a left margin in an image 400D of a visitor's web browser, on a visitor's computer, such as 108. The website home page 443D is shown without various content for clarity of the FIG. 4D. A non-display area 441D of the image 400D of the web browser would typically include the browser's own icons, URL box, menu bar etc., not shown in FIG. 4D. The web site home page 443D is displayed in the display area 442D of the image 400D of the web browser on the visitor's computer, such as 108. The website home page 443D is shifted off the left edge of the web browser's display area 442D by a distance of HG1, which is equal to HG1 shown in FIG. 4C. Such a display of a home page 443D with a left margin occurs when the home page 443D is hosted with a shift of the template 481 from the cross-hairs 480 in the hosting page 400C as shown in FIG. 4C. Similarly, even a top margin can be achieved by shifting the website template 481 off the cross-hairs in a downwards direction.

FIG. 4E shows a hosting page 400E, which includes a website home page template 481 shifted across the cross-hairs 480 in a horizontal direction. Cross-hairs 480 includes vertical line 480a and horizontal line 480b whose intersection point represents the top, left corner vertex of a browser's display area on a visitor's computer, such as 108. The website home page template 481 is shifted as a whole across the cross-hairs vertical line 480a by a distance of HO1. LW is the left-over width of the website left on the right of the cross-hairs 480. A website home page hosted with such a positional arrangement in the hosting page 400E is displayed on a computer monitor of a visitor computer 108 by a visitor's web browser computer software program running on the visitor computer 108 with a cut-off equal to the same distance HO1, as shown in FIG. 4F.

FIG. 4F shows a website home page 443F displayed with a cut-off on the left side in an image 400F on a computer monitor as produced by a visitor's web browser computer program running on a visitor computer 108. The website home page 443F is shown without various content for clarity of FIG. 4F. Item 441F is a non-display area of the web browser, which typically would include the browser's own icons, URL box, menu bar etc., which are not shown in FIG. 4F. Item 442F is the display area of the web browser wherein a website web page, such as 443F, is displayed. The web site home page 443F is displayed in the display area 442F of the image 400F on the computer monitor produced by the web browser computer software running on the visitor computer 108. The website home page 443F is cut off on the left side by a width of HO1, which is equal to HO1 shown in FIG. 4E. The visible width of the website home page 443F displayed in the web browser is equal to LW shown in FIG. 4E. Such a display of a home page 443F with a cut-off on the left side occurs when the home page 443F is hosted with the template 481 shifted across the cross-hairs 480. Similarly, even a cut-off on the top can be introduced by shifting the template 481 in FIG. 4E across the cross-hairs 480 in an upwards direction.

Figure 5A:
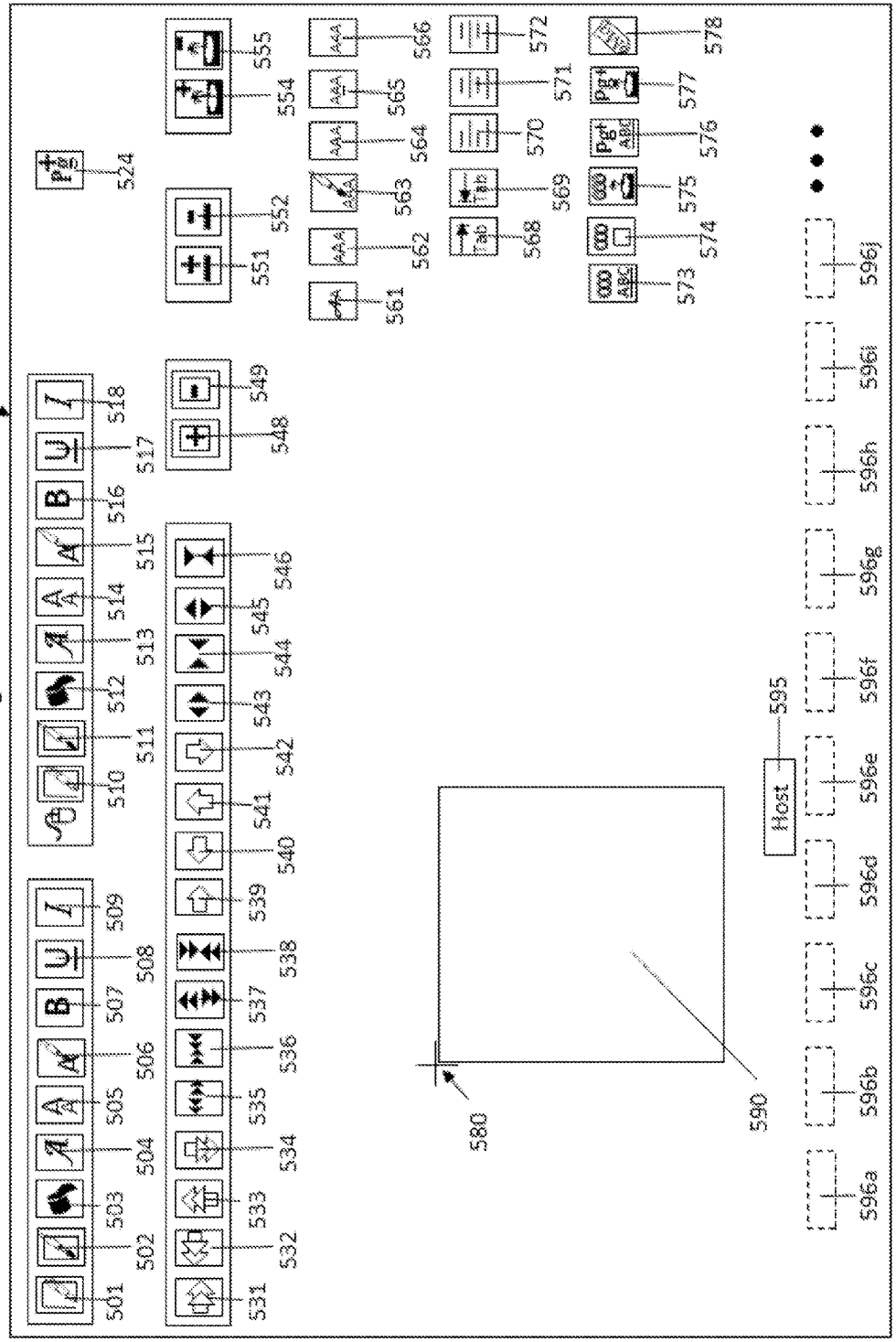
FIG. 5A shows a hosting page comprising a set of control buttons, a website secondary page template and/or a second template web page display, and a set of hidden boxes, in accordance with an embodiment of the present invention, wherein the website home page of FIG. 5A is displayed on a computer monitor of the user computer of FIG. 1, by a computer software web browser program stored in computer memory of the user computer and executed by a computer processor of the user computer.

FIG. 5A shows a web page 500A, which can be displayed on a computer monitor of a user computer 106 in accordance with an embodiment of the present invention. The web page 500A may be stored on the server computer 102, and can be displayed on a user computer 106 when a user clicks, using the mouse pointer 499 controlled by a computer mouse of the user computer 106, any of the control buttons 424, 476 and 477 of web page 400A. The web page 500A comprises a set of control buttons 501-578, a cross hair or cross hairs 580, a visible box 590, a host button 595, and a set of hidden boxes 596a-596j. All the control buttons 501-578 serve the same purpose as their similarly numbered counterparts, control buttons 401-478, respectively, in web page 400A. The cross-hairs 580 includes a vertical line 580a and horizontal line 580b as shown in FIG. 5C.

The cross-hairs 580, that looks like a "+" symbol has a different purpose from the cursor 489. The cross-hairs 580 works as a benchmark or reference point for the top-left corner vertex of the box 490 of FIG. 4A. A user should always ensure that the top-left corner vertex of box 590 should coincide with the intersection point of the vertical line 580a and horizontal line 580b of the cross-hairs 580. Otherwise, the box 590 will overlap on or shift away from the navigation buttons 484a-484k and box 486 hosted through the hosting page 400A in FIG. 4A, which again appear in the secondary web page displayed by a visitor's browser software, because the boxes 484a-484k and 486 are global items and in at least one embodiment appear in all secondary web pages hosted using the hosting page 500A of FIG. 5A. That is why a user typically does not host them again in the secondary page 500A, because that would be a duplication. The cross-hairs, such as cross hairs 580, is fixed and never moves on the screen. Cross-hairs 580 is fixed at the point with the same co-ordinates as top-left corner vertex of box 490 in FIG. 4A. In the initial display of the secondary page template 500A, the top-left corner vertex of box 590 coincides with the intersection point of cross-hairs 580. By mistake if the box 590 is dislocated from the cross-hairs 580 position, the user should bring the box 590 back to the cross-hairs 580 using the location control buttons 531-534 and 539-542. Similarly, mid points or intersection points (similar to mid point or intersection point of 580) of cross-hairs 680, 780, 880, 980, and 1080 of the template web pages 600, 700, 800, 900, and 1000, respectively coincide with the top-left corner vertex of box 490 of home page template 400A. These cross-hairs do not appear in the actual web pages that a visitor visits on a website. Cross-hairs 480 of home page template 400A differs in its benchmarking from the cross-hairs 580 of the secondary page template 500A and other cross-hairs, 680, 780, 880, 980, and 1080 of facilities page templates. Cross-hairs 480 represents the top-left corner vertex of a browser's display area, while all other cross-hairs 580, 680, 780, 880, 980, and 1080 represent the top-left corner vertex of box 490 (the main content box of home page template 400A).

A user may keep a cursor, similar to cursor 489 in FIG. 4A, in the visible box 590 and type the content of the secondary web page he or she wishes to host in the visible box 590. Cross-hairs 580 serves as the (0,0) reference point for the content box 590 of the secondary web page, which exactly coincides with the top, left corner of the content box 490 of web page 400A. Control buttons 501-509 provide the same format effects as their counter parts 401-409 of web page 400A. In order to see the effect of a control button on the visible box 590, a user should keep a cursor such as 489 in the visible box 590 and click, using the user computer 106, an appropriate control button of the control buttons 501-578. Control buttons 510-518 provide the same mouse-over effects as their similarly numbered counter parts 410-418 of web page 400A do. Control button 524 enables to add another secondary web page that should be linked to a visible box in the current secondary web page. Control buttons 531-546 enable a user through user computer 106 to change the location and size of a visible box as their counter parts 431-446 of web page 400A do. Control buttons 548 and 549 enable a user through user computer 106 to add and remove boxes to and from the web page 500A. Control buttons 551 and 552 enable a user through user computer 106 to add and remove horizontal lines to and from web page 500A. Similarly, control buttons 554 and 555 enable a user to add and remove images to and from web page 500A. These buttons provide the same functionality as their counterparts in web page 400A do. However, the choice of global and local appearance of a visible box, line or image does not apply in this context, because all elements added to a secondary web page are treated local, that is, they appear only in the web page they are added to.

Control buttons 561-578 perform the same function as their counterparts 461-478, respectively, do in web page 400A. Item 595 is a Host button that is used for hosting the secondary web page as defined in the template of web page 500A. When the Host button 595 is clicked, all attributes and content of the visible box 590 and all other visible boxes and items that a user might have added to the web page 500A are written to hidden boxes 596a-596j, and immediately submitted to the server computer 102, where the attributes and contents of all visible boxes and other items are stored in a database 104. When a visitor visits the website and clicks the button, image or hyperlinked text to which this particular web page is linked, the server computer 102 retrieves all the attributes and content of all the secondary web page items and passes them to the visitor's computer 108, where the secondary web page is constructed and displayed by the browser computer software of the visitor computer 108.

Figure 5B:
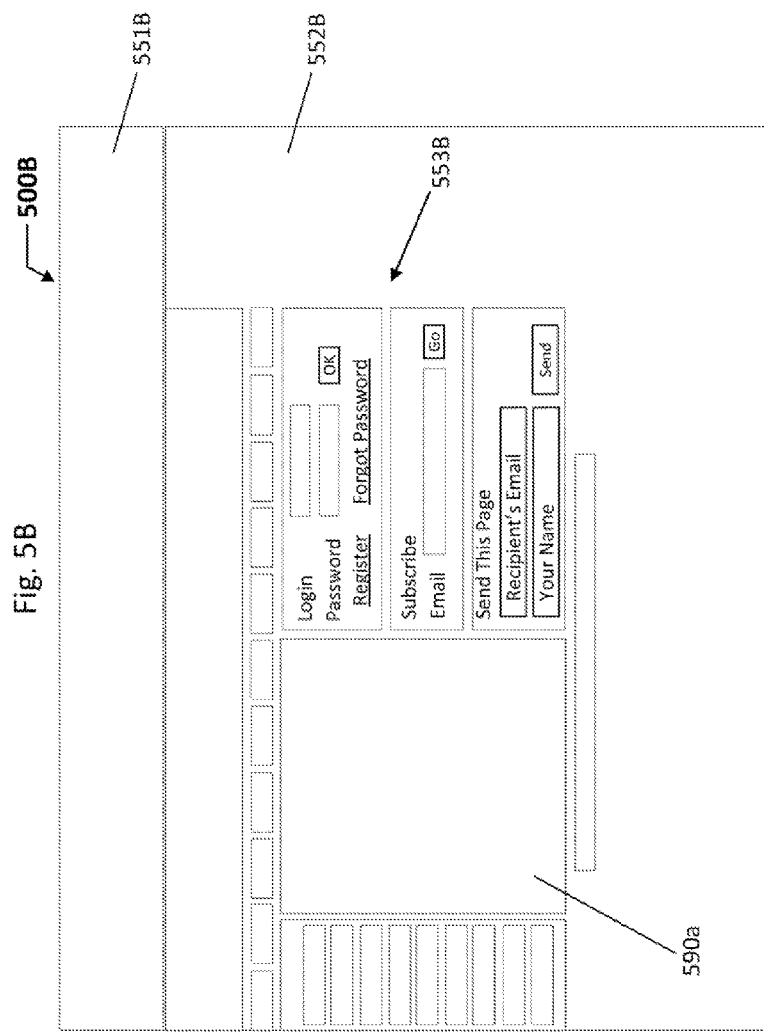
FIG. 5B shows a website secondary page and/or second template web page display with properly located content box, displayed on a computer monitor of the visitor computer of FIG. 1, in accordance with an embodiment of the present invention, wherein the website secondary page of FIG. 5B is displayed on a computer monitor of the visitor computer of FIG. 1, by a computer software web browser program stored in computer memory of the visitor computer and executed by a computer processor of the visitor computer.
Figure 5C:
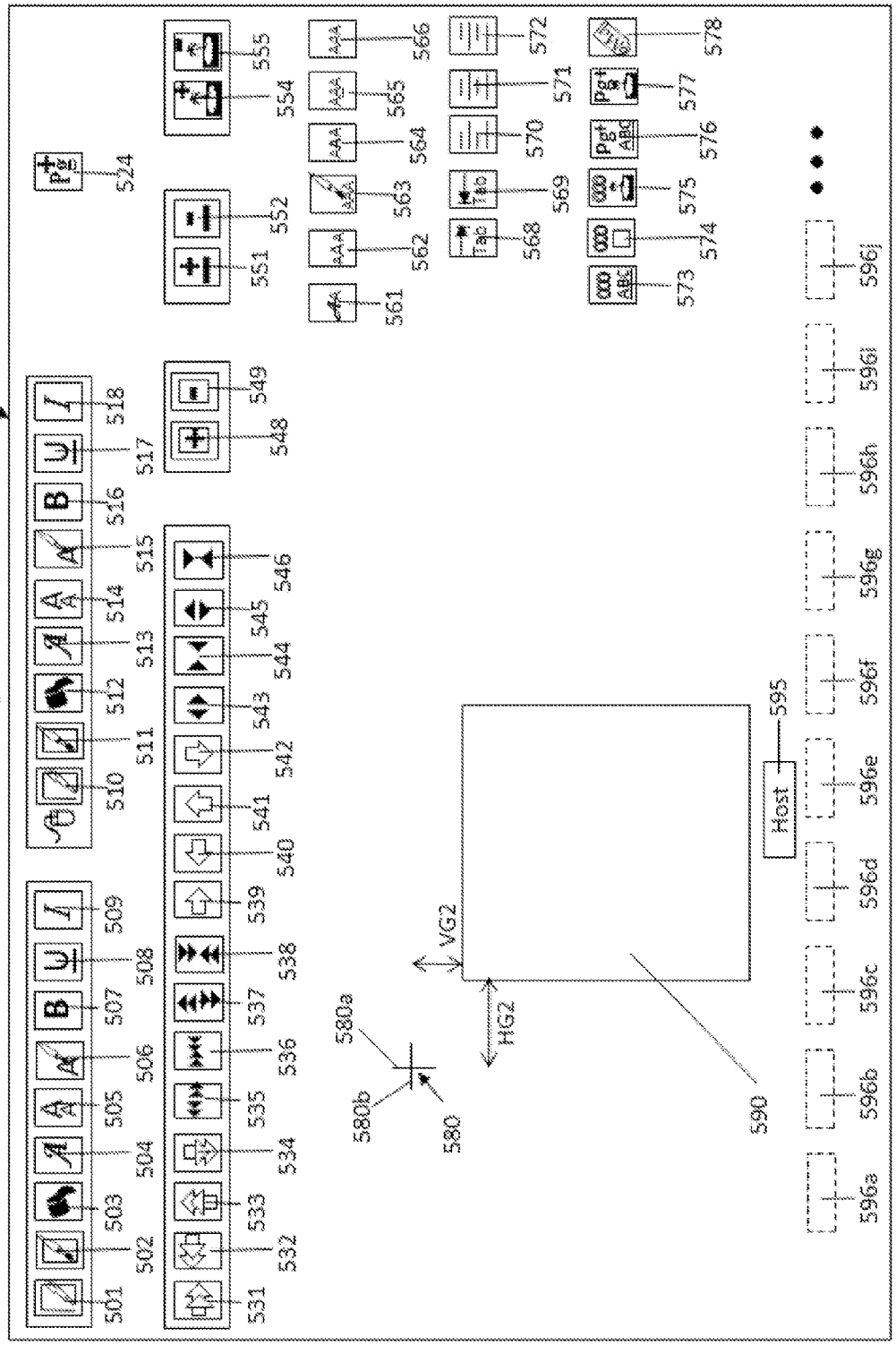
FIG. 5C shows a hosting page including a website secondary page template shifted off the cross-hairs in both horizontal and vertical directions, in accordance with an embodiment of the present invention, wherein the hosting page of FIG. 5C is displayed on a computer monitor of the user computer of FIG. 1, by a computer software web browser program stored in computer memory of the user computer and executed by a computer processor of the user computer.

FIG. 5B shows a website secondary page 553B displayed in an image 500B produced by a visitor's web browser computer software on a computer monitor of a visitor computer, such as 108. The website secondary web page 553B is shown without various content for clarity of FIG. 5B. Item 551B is a non-display area of the image 500B of the web browser, which typically includes the browser's own icons, URL box, menu bar etc., not shown in FIG. 5B. Item 552B is a display area of the web browser wherein the website secondary page 553B is displayed. The web site secondary page 553B is displayed in the display area 552B in the image 500B produced by the web browser computer software running on the visitor computer 108. The location of the main content box 590a of the website secondary page 553B exactly coincides with that of the main content box 490a of the website home page 443B in FIG. 4B. Such a display of a secondary web page 553B can be achieved by hosting the secondary web page 553B using a hosting page 500A shown in FIG. 5A wherein the top-left corner vertex of box 590 coincides with the intersection point of cross-hairs 580.

FIG. 5C shows a hosting page 500C including a website secondary page template, (box 590) shifted off the cross-hairs 580 in both horizontal and vertical directions. Cross-hairs 580 includes vertical line 580a and horizontal line 580b whose intersection point represents the top, left corner vertex of box 490 of home page template 481 in FIG. 4A. The website secondary page box 590 is shifted away by a distance of HG2 from the cross-hairs vertical line 580a, and by a distance of VG2 from the cross-hairs horizontal line 580b. A website secondary page, such as 553D, hosted with such a positional arrangement of the template 590 in the hosting page 500C is displayed with the box 590a shifted away from the position of its similar box 490a in home page 400B of FIG. 4B by the same distance of HG2 and VG2 in horizontal and vertical directions respectively, on a visitor's computer 108 as shown in FIG. 5D.

FIG. 5D shows a website secondary web page 553D displayed in an image 500D produced on a computer monitor by a visitor's web browser computer software running on visitor computer 108. The website secondary page 553D is shown without various content for clarity of the FIG. 5D. Item 551D is a non-display area on the image 500D of the web browser of the visitor computer 108, which typically includes the browser's own icons, URL box, menu bar etc., which are not shown in FIG. 5D. Item 552D is the display area of the web browser wherein a website is displayed. The website secondary page 553D is displayed in the display area 552D of the web browser. The website secondary page box 590a is shifted away from the location of its similar home page box 490a in FIG. 4B by the same distance of HG2 and VG2, shown in FIG. 5C, in horizontal and vertical directions, respectively. Such a display of a secondary web page, such as 553D with a dislocated box 590a occurs when the secondary page 553D is hosted with the box 590 shifted away from the cross-hairs 580 as shown in FIG. 5C.

Figure 5E:
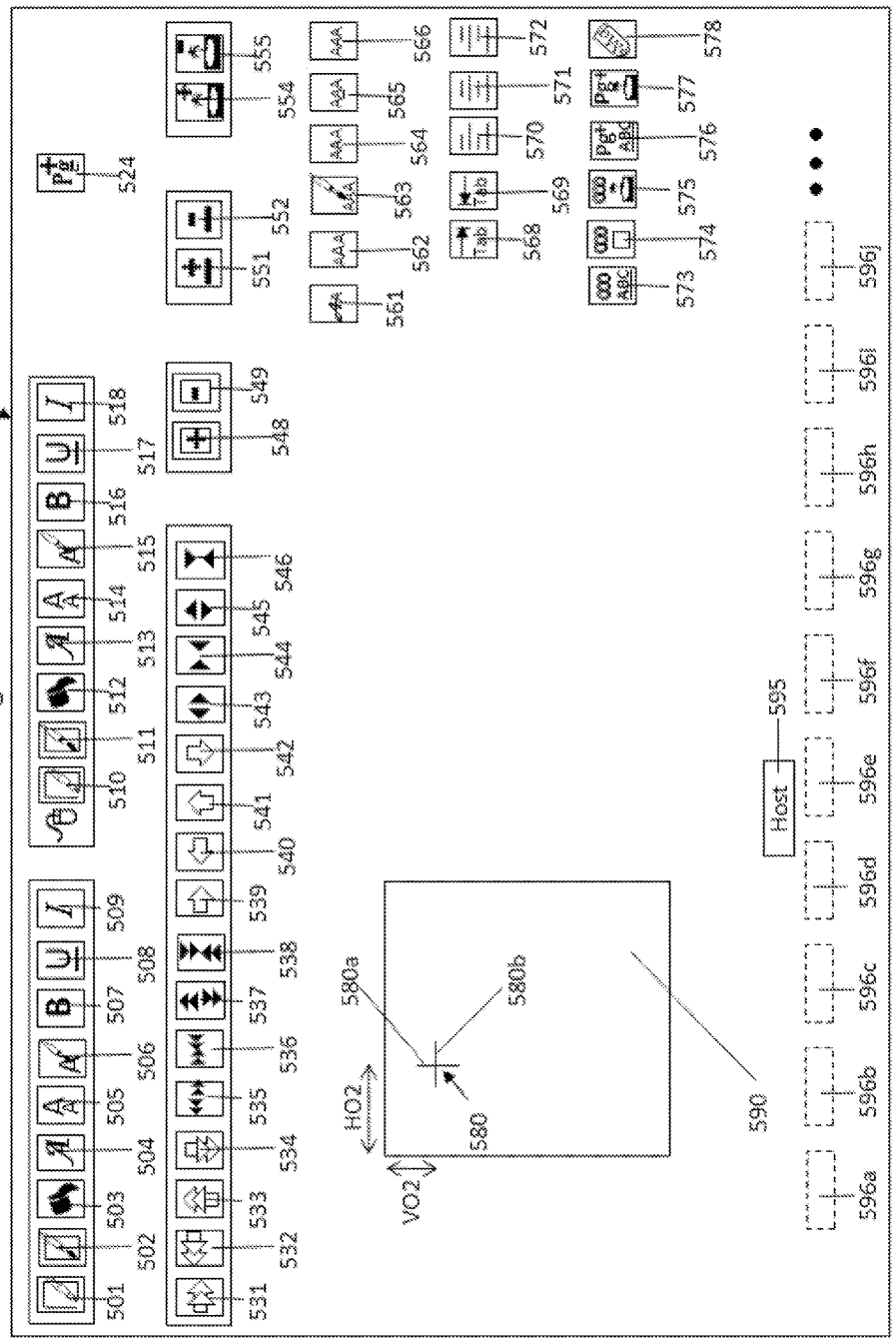
FIG. 5E shows a hosting page including a website secondary page template shifted across cross-hairs in both horizontal and vertical directions, in accordance with an embodiment of the present invention, wherein the website home page of FIG. 5E is displayed on a computer monitor of the user computer of FIG. 1, by a computer software web browser program stored in computer memory of the user computer and executed by a computer processor of the user computer.

FIG. 5E shows a hosting page 500E, which would be displayed on a computer monitor of the user computer 106 including a website secondary page template (box 590) shifted across the cross-hairs 580 in both horizontal and vertical directions. Cross-hairs 580 includes a vertical line 580a and a horizontal line 580b whose intersection point represents the top, left corner vertex of box 490 in the website home page template 400A shown in FIG. 4A. Box 590 is shifted across the cross-hairs 580 by a distance of HO2 and VO2 in horizontal and vertical directions, respectively, versus the location of box 490. A secondary web page 553F of FIG. 5F hosted with such a positional arrangement of the template 590 as shown in FIG. 5E, is displayed by use of a visitor's web browser computer program with the box 590a overlapping on its adjacent boxes on the left and top by the same lengths of HO2 and VO2, as shown in FIG. 5F.

FIG. 5F shows a website secondary page 553F displayed in an image 500F produced on a computer monitor of a visitor computer 108 by use of a visitor's web browser computer software running on visitor computer 108, with its main content box 590a overlapping on its adjacent boxes on the left and top. The website secondary page 553F is shown without various content for clarity of FIG. 5F. Item 551F is a non-display area of the image 500F produced by the web browser of the visitor computer 108 on a computer monitor of the visitor computer 108, which typically includes the browser's own icons, URL box, menu bar etc., not shown in FIG. 5F. Item 552F is a display area produced by the web browser wherein a website secondary page 553F is displayed. The web site secondary page 553F is displayed in display area 552F of the web browser. The secondary page box 590a is overlapping on its adjacent boxes on the left and top by the same lengths of HO2 and VO2 shown in FIG. 5E in horizontal and vertical directions respectively. Such a display of a secondary web page 553F with an overlapping box occurs when the secondary web page 553F is hosted with the box 590 moved across the cross-hairs 580 as shown in FIG. 5E.

FIG. 6 shows a webmail hosting page 600, which can be displayed on the user computer 106 in accordance with an embodiment of the present invention. The hosting page 600 may be stored on the server computer 102, and can be displayed on the user computer 106 when a user clicks, using a computer mouse of the user computer 106, the control button 420 of web page 400A. The hosting page 600 comprises a set of control buttons 601-678, a cross hair 680, a webmail form template 681, which includes in one embodiment a set of visible boxes 690, 690a-690j, a host button 695, and a set of hidden boxes 696a-696j. All the control buttons and hidden boxes serve the same purpose as their counterparts do in web page 400A. Web page 600 also comprises a non-editable label 685a and a non-modifiable box 685b.

Control buttons 601-678 perform the same functions as their similarly numbered counterparts, 401-478, respectively, do in web page 400A. Using these control buttons 601-678, through the use of user computer 106, the webmail form can be redesigned for its size, and look and feel. Visible box 690 provides a background and border to the webmail form. The background color and border of the webmail form can be changed by keeping a cursor in the visible box 690 and using the control buttons as required. Item 685a is a non-editable label reading "Receiving Email for Webmail". Item 685b is an non-modifiable input box for entering the email id where the webmail should be received. Visible box 690a provides a header label, which currently is "Contact Us" for the webmail form to be hosted on the website. The location, text, font and color of the label 690a can be modified by keeping the cursor in a box of the label 690a (border not visible since suppressed) and using the control buttons as required. Visible boxes 690b-690i provide labels and input boxes for various fields of the webmail form. The labels, input boxes and send button 690j can be modified for their text, size, location, fonts and colors using the relevant control buttons. The labels 690a, 690b, 690d, 690f, and 690h are also contained by visible boxes, but with suppressed borders to provide the normal outlook of a webmail form. Note, in the case of some of the "visible" boxes, such as 690a, 690b, 690d, 690f, and 690h, a "box" is not visible even though these are called "visible" boxes. For 690a, 690b, 690d, 690f, and 690h, these can be termed visible boxes which have suppressed borders. These "boxes" are called "visible boxes" because their content is visible. In at least one embodiment, "hidden" boxes such as 696a-j are completely invisible, and neither their borders nor their contents are visible, and also you can not click on them and place your cursor in those boxes. Visible box 690j represents a Send button of the webmail form, which can also be modified using the control buttons. Once the webmail form is redesigned, a user, by use of user computer 106, may click the Host button 695 to immediately write the receiving email id and all attributes of the visible boxes to hidden boxes 696a-696j and submit them to the server computer 102. The server computer 102 stores all the details in a database 104. When a visitor, using visitor computer 108, visits the website, by displaying a web site page on a computer monitor of the visitor computer 108, and clicks the box on the home or secondary page linked to the webmail form, the server computer 102 retrieves all attributes from the database 104 and passes them to the visitor computer 108, where the webmail form is constructed and displayed on a computer monitor of the visitor computer 108 by the web browser computer software stored in computer memory and running on a computer processor of the visitor computer 108, with the receiving email id in a hidden box not visible on a computer monitor of the visitor computer 108. A visitor can fill the webmail form and click the Send button, using a computer mouse of the visitor computer 108, which will send email to the receiving email id (identification).

FIG. 7 shows a Registration form hosting page 700, which can be displayed on a user computer 106 in accordance with an embodiment of the present invention. The Registration form hosting page 700 may be stored on the server computer 102, and can be displayed on a user computer 106 when a user clicks, using a computer mouse of the user computer 106, the control button 421 of web page 400A. The Registration Form hosting page 700 comprises a set of control buttons 701-778, a cross hairs 780, a registration form template 790, a host button 795, and a set of hidden boxes 796a-796j.

Control buttons 701-778 perform the same functions as their similarly numbered counterparts 401-478, respectively, do in web page 400A. Using these control buttons, the registration form can be redesigned for its size, and look and feel. The template 790 comprises a large outline box that provides a background and border for the registration form to be hosted on the website. The background color and border of the registration form can be changed by keeping a cursor in the outline box and using the control buttons as required. The outline box is superimposed by a number of small visible boxes for defining header, labels, input boxes and a register button of the form. The labels, input boxes, and register button of the template 790 can be modified for their text, size, location, fonts and colors etc using the relevant control buttons, buttons 701-778. The labels, within the template 790, such as "Your Name", and "Your Email" are contained by boxes with suppressed borders to provide the normal outlook of a registration form. Once the registration form is redesigned, a user may click, using a computer mouse of the user computer 106, the Host button 795 to immediately write all details of the visible boxes to hidden boxes 796a-796j and submit them to the server computer 102. In this case, "visible" boxes again refer to both labels which have suppressed bordering such as "Your Name", "Your Email", "Profession", "Address", "City", "Zip", "Country", "User Name", "Password", "Confirm Password", and "Joining Message" and to the currently empty boxes within template 790 shown in FIG. 7. The server computer 102 stores all the details in the database 104. When a visitor visits the website, using the visitor computer 108 and clicks, using a computer mouse of the visitor computer 108, a register link in the login box on the website home page or secondary web page, the server computer 102 retrieves all the details from the database 104 and passes them to the visitor computer 108, where the registration form is constructed and displayed by the web browser computer program stored in computer memory of the visitor computer 108 and executed by a computer processor of the visitor computer 108. A visitor can fill the registration form and click the Register button, within the hosted registration form of template 790, as displayed on the visitor computer 108, in order to register himself or herself on the website.

FIG. 8 shows a "Forgot Password" form hosting page 800, which can be displayed on a computer monitor of the user computer 106 in accordance with an embodiment of the present invention. The "Forgot Password" form hosting page 800 may be stored on the server computer 102, and can be retrieved from the server computer 102 and displayed on the user computer 106 when a user clicks the control button 422 of web page 400A, using a computer mouse of the user computer 106. The "Forgot Password" form hosting page 800 comprises a set of form control buttons 801-878, a cross hairs 880, a "Forgot Password" form template 890, a host button 895, and a set of hidden boxes 896a-896j.

Control buttons 801-878 perform the same functions as their similarly numbered counterparts 401-478, respectively, do in web page 400A. Using these control buttons, the "Forgot Password" form can be redesigned for its size, and look and feel. The template 890 comprises a large visible outline box that provides a background and border for the "Forgot Password" form to be hosted on the website. The background color and border of the "Forgot Password" form can be changed by keeping the cursor in the outline box of template 890 and using one or more of the control buttons 801-878 as required. The outline box is superimposed by a number of small visible boxes for defining the header, labels, input boxes and OK button of the form. The labels, input boxes, and OK button can be modified for text, size, location, fonts and colors etc using one or more of the control buttons 801-878. The labels are contained by "visible" boxes with suppressed borders to provide the normal outlook of a "Forgot Password" form, i.e. labels "User Name" and "Your Email" are defined, in one embodiment, as being contained in "visible" boxes with suppressed borders. Once the "Forgot Password" form is redesigned, a user may click the Host button 895 to immediately write all details of the visible boxes in template 890 to hidden boxes 896a-896j and submit them to the server computer 102. The server computer 102 stores all the details in the database 104. When a visitor visits the website, using the visitor computer 108, and clicks the "Forgot Password" link in the login box on the website home page or a secondary page, on a computer monitor of the visitor computer 108, the server computer 102 retrieves all the details from the database 104 and passes them to the visitor computer 108, where the hosted "Forgot Password" form of template 890 is constructed and displayed by the web browser computer software stored in computer memory and running on a computer processor of the visitor computer 108. A visitor can fill the hosted "Forgot Password" form of template 890 on the visitor computer 108, and click the OK button within the hosted "Forgot Password" form of template 890, using a computer mouse of the visitor computer 108 in order to request the server computer 102 to send a temporary password to his or her email id (identification), using which the password can be reset.

Figure 9:
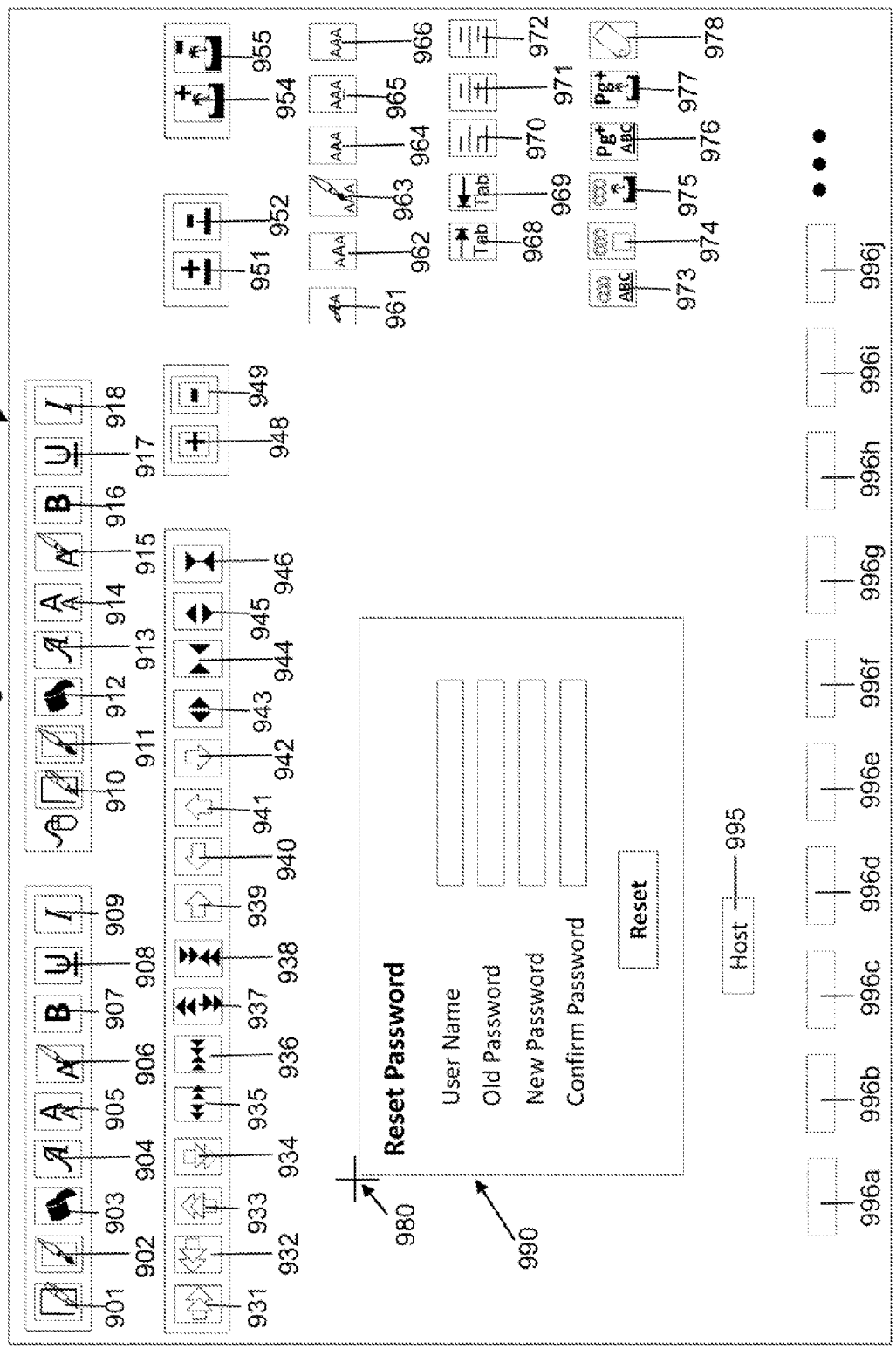
FIG. 9 shows a hosting page displayed on a computer monitor of the user computer of FIG. 1, comprising a set of control buttons, a reset password form template, and a set of hidden boxes, in accordance with an embodiment of the present invention, wherein the web page of FIG. 9 is displayed on a computer monitor of the user computer of FIG. 1, by a computer software web browser program stored in computer memory of the user computer and executed by a computer processor of the user computer

FIG. 9 shows a "Password Reset" form hosting page 900, which can be displayed on the user computer 106 in accordance with an embodiment of the present invention. The "Password Reset" form hosting page 900 may be stored on the server computer 102, and can be displayed on the user computer 106 when the user clicks, using a computer mouse of the user computer 106, the control button 423 of web page 400A. The "Password Reset" form hosting page 900 comprises a set of form control buttons 901-978, a cross hair 980, a "Password Reset" form template 990, a host button 995, and a set of hidden boxes 996a-996j.

Control buttons 901-978 perform the same functions as their similarly numbered counterparts 401-478, respectively, do in web page 400A. Using these control buttons 901-978, the "Password Reset" form can be redesigned for its size, and look and feel. The template 990 comprises a large visible outline box that provides a background and border for the "Password Reset" form to be hosted on the website. The background color and border of the "Password Reset" form can be changed by keeping the cursor in the visible box 990 and using one or more of the control buttons 901-978 as required. The outline box of template 990 is superimposed by a number of small visible boxes for defining header, labels, input boxes and the Reset button of the form. The labels, input boxes, and Reset button can be modified for their text, size, location, fonts and colors etc using the relevant control buttons. The labels are contained by boxes with suppressed borders to provide the normal outlook of a "Password Reset" form. Once the "Password Reset" form is redesigned, a user may click, using a computer mouse of the user computer 106, the Host button 995 to immediately write all details of the visible boxes to hidden boxes 996a-996j and submit them to the server computer 102. "Visible boxes", in at least one embodiment, includes the labels "Reset Password", "User Name", "Old Password", "New Password" and "Confirm Password", even though a "box" cannot be seen in FIG. 9. The server computer 102 stores all details of the "Password Reset" form in the database 104. When a registered visitor forgets his or her password and requests the server computer 102 for a temporary password, he or she receives an email from the server computer 102 with a temporary password and a link to the Password Reset page. When the visitor clicks the link to the Password Reset page, the sever computer 102 retrieves all details of the form and passes them to the visitor's computer 108, where the "Password Reset" form is opened in the computer software web browser of the visitor computer 108. The visitor may fill in all input boxes of the "Password Reset" form and reset his or her password by clicking the Reset button.

Figure 10:
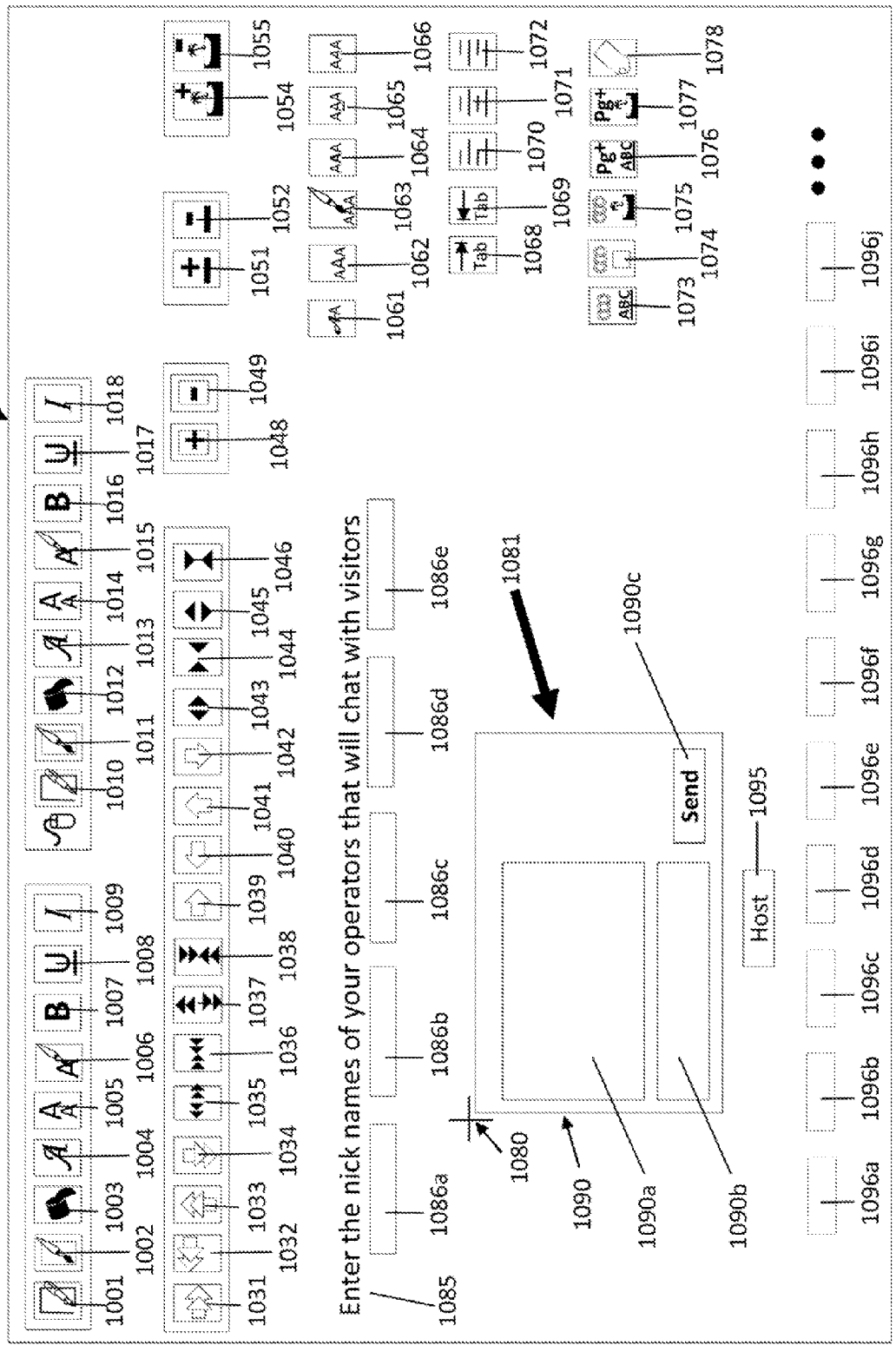
FIG. 10 shows a hosting page displayed on a computer monitor of the user computer of FIG. 1, comprising a set of control buttons, a chat box template, and a set of hidden boxes, in accordance with an embodiment of the present invention, wherein the web page of FIG. 10 is displayed on a computer monitor of the user computer of FIG. 1, by a computer software web browser program stored in computer memory of the user computer and executed by a computer processor of the user computer.

FIG. 10 shows a Chat Box hosting page 1000, which can be displayed on a user computer 106 in accordance with an embodiment of the present invention. The Chat Box hosting page 1000 may be stored on the server computer 102, and the page 1000 can be displayed on the user computer 106 when a user clicks, using a computer mouse of the user computer 106, the control button 425 of web page 400A. The Chat Box hosting page 1000 comprises a set of form control buttons 1001-1078, a cross hair 1080, a chat box template 1090, a host button 1095, and a set of hidden boxes 1096a-1096j. The web page 1000 also comprises a non-editable text string 1085, and a set of non-modifiable input boxes 1086a-1086e for defining the nick names of operators that will chat with website visitors. There can be more boxes for defining operator nick names, or alternatively boxes can be created dynamically depending on a user requirement. All the control buttons and hidden boxes serve the same purpose as their counterparts do in web page 400A.

Control buttons 1001-1078 perform the same functions as their similarly numbered counterparts 401-478, respectively, do in web page 400A. Using these control buttons, the "Chat Box" template 1090 can be redesigned for its size, and look and feel. The template 1090 comprises a large visible outline box that provides a background and border for the Chat Box 1090 to be hosted on the website. The background color and border of the Chat Box can be changed by keeping cursor in the visible box 1090 and using the relevant control buttons as required. The outline box 1090 is superimposed by two small visible input boxes, one box 1090b for entering chat text and another box 1090a for viewing chat dialogue, and a Send button 1090c to send chat messages. The input boxes 1090a and 1090b, and Send button 1090c can be modified for their size, location, font, color etc using the relevant control buttons. Once the Chat Box form is redesigned, the user may click the Host button 1095 to immediately write all the details of the visible boxes of template 1090 to hidden boxes 1096a-1096j and submit them to the server computer 102. The server computer 102 stores all the attributes in the database 104. When a visitor clicks an image or button, using a computer mouse of the visitor computer 108, on the website, while it is displayed on a computer monitor of the visitor computer 108, that links to the chat box 1090, the sever computer 102 retrieves all attributes of the Chat Box 1090 and passes them to the visitor's computer 108, where the chat box 1090 is constructed and displayed in the web browser computer software program of the visitor's computer 108, thereby enabling a visitor to chat with a website operator. A chat computer software application installed in computer memory on the server computer 102 will handle the chat operation between a visitor through visitor computer 108 and a website operator.

FIG. 11 shows an RSS Feeds selection web page 1100, which can be displayed on a user computer 106 in accordance with an embodiment of the present invention. The RSS Feeds selection web page 1100 may be stored on the server computer 102, and the web page 1100 can be displayed on the user computer 106 when a user clicks the control button 426 of web page 400A, using a computer mouse of the user computer 106. The RSS Feeds selection web page 1100 comprises a list of RSS Feeds that a web application computer software program stored in computer memory on the server computer 102 provides, out of which a user can select the ones he or she is interested to provide on his or her website. When a user clicks the OK button in FIG. 11, after selecting one or more of the feeds (such as for example "Sports" and "Movies"), the selected feeds information is written to the hidden boxes 1196a-1196j and submitted immediately to the server computer 102, where it is stored in the database 104. When a visitor visits the website, using visitor computer 108, and clicks, using a computer mouse of the visitor computer 108, an image or button that links to a page that provides news, the server computer 102 will send the RSS Feeds information to the visitor computer 108, where the RSS Feeds information is displayed as news links, through which the visitor can browse news on the available topics, on the visitor computer 108.

Usually when a web page is submitted to a server computer, it disappears from the browser screen and displays a message of successful submission of the web page. However, an important feature of this codeless website hosting system ("codeless" in the sense that the user doesn't have to do any coding) is that when the host button of a hosting page is clicked to submit the hosting page to the server computer 102, the hosting page will not disappear from the computer browser screen of the user computer 106. The hosting page is retained on the browser screen of the user computer while it is submitted in the background. This feature allows a user to do any forgotten changes to the visible items of the hosting page and re-host the web page. Whenever a web page is hosted or re-hosted a small pop-up screen will appear on the computer monitor of the user computer giving a message of successful hosting. The user can close the hosting page when he or she has completed the web page design and has no more changes left to be done to the web page. Another important feature of this system is that a hosted web page can be reopened from the server computer later to do any further changes to the web page. When an already hosted web page is reopened, the hosting page displays all the visible items of the web page along with their content and defined attributes in the previous hosting. The user can do whatever changes he or she wishes to do and click the host button to re-host the web page.

The concept of codeless websites works with virtual web pages, which are not concrete web pages stored as files on a server hardware. Instead, the attributes (details) of every web page are stored in a database on a hosting server. The full URL of a web page hosted through the web application computer software program of at least one embodiment of the present invention, is comprised of two parts. While the first part indicates a URL of the web computer software application, the second part indicates a query string. When the server computer, such as 102, receives a request from a visitor, such as from visitor computer 108, for a particular web page, the server computer 102 retrieves attributes of the web page from a database 104 based on the query sting of the request and passes them to the visitor computer 108 with print statements for the browser computer program of the visitor computer 108, wherein the web page is constructed on-the-fly and displayed by the web browser computer program of the visitor computer 108. The first term of the query string indicates the sub-domain name, while the second term represents the page that a visitor wishes to visit on the sub-domain. Suppose the second term of the query string is the word "Home", the server computer, such as 102, will retrieve the attributes of the home page of the sub-domain indicated by the first part of the query string. The second term of a query string for a secondary web page will be the name of the box, image, or text string on the home page that links to the secondary page. Similarly, key words such as webmail, registration, forgot password, password reset, chat, and RSS feeds as second part of the query identify the facilities pages that a visitor wishes to visit, and accordingly the server computer 102 retrieves all attributes from the database 104 and passes them to the visitor computer 108. The query string may comprise more than two terms for chain linked pages. For instance, a secondary web page linked to a box in another secondary web page is identified by a three-term query string. While the second term of the query string identifies the box or other item on the home page that links to the first level secondary page, the third one identifies the box or other item in the first level secondary web page that links to the second level secondary web page. Boxes in a web page are identified by their sequence number such as box1, box2, box3, . . . , boxn. Similarly, horizontal lines, images, hyperlinked text strings etc are also identified by their sequence number appended to a key word such as line, image, string etc, respectively. When the server computer 102 receives a request from a visitor computer 108 for a web page, it searches the database for a record with the primary key value equal to the query string of the request and passes all attributes to the visitor computer 108.

Images, lines, and video files added to a template web page on a user computer 106 before hosting are presented as is in the real web page displayed on a visitor computer 108 without any inter-element transformations. However, boxes which may be html text boxes or text areas in a template web page are transformed to html tables in the real web page displayed on a visitor computer 108. This concept enables boxes to be filled with content and customized for their location, size, color, font, mouse-over effects etc so that a user can achieve the desired layout for his or her website. All visible boxes except input boxes are converted to html tables in the actual web page that will be displayed on a visitor computer, such as the visitor computer 108. Input boxes remain as is without transformation in the actual web page that visitors view on the website. Note that template or box 590 in FIG. 5C is typically an HTML text area, which can be resized, relocated, and redesigned using control buttons through some script functions incorporated in the hosting page of FIG. 5C. However, the actual secondary web page, such as 590a in FIG. 5D of the website that a visitor views on visitor computer 108 should not be modifiable. For a visitor, the page is only meant for viewing, not for designing. Visitors should not be allowed to place a cursor in the box 590a and edit the content and do all sorts of things such as resizing and relocating the box 590a. This is why, in a visitor's version of the page, the box 590a should be coded as an html table cell which just displays the content with the user defined background color, font, border etc. This is why a html text box or text area or template such as 590 in a hosting page is transformed to a html table cell 590a or input box of the same size, location, background, border, font etc. in the actual web page accessible to visitors, depending upon the function of the element.

Further, the concept also enables to host websites with dynamic html menus without requiring any coding by users.

It is possible to implement both horizontal and vertical dynamic html menus with the box-based web page templates.

In accordance with at least one embodiment of the present invention, the concept of codeless website hosting without any file transfers can be extended to any other known and unknown facilities that a website can provide to its visitors. Even facilities such as a shopping cart, forum, and social network can be added to websites without requiring any software development skills.

The invention will be very useful for individuals who do not posses any knowledge of software programming, coding, and scripting languages. It enables even a layman with minimal knowledge of the Internet to host his or her full-fledged website including all general facilities just by filling simple forms and clicking buttons without uploading any concrete files through FTP (File Transfer Protocol) to a hosting server.

FIG. 12 shows a flow chart 1200 of steps involved in a prior art process of hosting a web page by a user of the prior art system described in U.S. Pat. No. 7,610,219 to Sayed.

The process starts with step 1202 wherein a user computer requests a template web page computer code file from a server computer. The template web page computer code file requested can be an ".html", ".asp", ".jsp", or ".php" file, or the like. Regardless of which of these files are used, the template web page computer code file will have HTML tags in the prior art system and/or method shown by FIG. 12.

At step 1204, the server computer of the prior art system supplies the template web page computer code file (having HTML tags) to a user computer of the prior art system.

At step 1206, a user computer (as operated by a user) modifies the template web page computer code file. The user computer stores the modified template web page computer code file in user computer memory (on hard disk) as a file having HTML tags.

At step 1208 the user computer sends the modified web page computer code file (having HTML tags) to the server computer of the prior art in response to a user uploading the modified web page computer code file (having HTML tags) through a File Manager of a Site Building module of the prior art system.

Note that in the prior art system, apparatus, and process explained by FIG. 12, the File Manager is a computer program which is typically not a utility computer program like Microsoft (trademarked) Word (trademarked) or Power Point (trademarked) of the user's operating system such as Windows (trademarked). Rather the File Manager of the prior art is typically a utility computer program of a Site Building computer program module (hosted on the server computer and accessed by the user computer) of the prior art system. Once the user completes his template web page modification to form the modified web page computer code file (having HTML tags) and saves it on the hard disk of user computer memory, the user can then click a button on a window on the user computer monitor formed by the modified web page computer code file. The window will open a File Manager screen displaying a local directory structure (on the user computer) and files on one side and the server's directory structure (on the server computer) and files on the other side as shown in FIG. 5 of prior art U.S. Pat. No. 7,610,219. The files can be uploaded manually by drag and drop from one side to the other.

At step 1210, the server computer receives the modified template web page computer code file (having HTML tags) and stores as a modified template web page computer code file (having HTML tags) on hard disk computer memory of server computer.

At step 1212, a visitor computer requests the modified template web page computer code file (having HTML tags) from the server computer and the server computer supplies modified template web page computer code file (having HTML tags) to the visitor computer.

FIGS. 13A-B show a flow chart 1300 of steps involved in a method, system and apparatus in accordance with one or more embodiments of the present invention.

The process starts with step 1302 wherein a user computer, such as the user computer 106, shown in FIG. 1, requests a template web page computer code file through a web browser computer program running on a computer processor of the user computer 106, from a server computer 102. The template web page computer code file includes HTML tags and script computer programming code containing various functions that are executed when a user clicks control buttons, such as 401-478 or host button, such as 495, shown in FIG. 4A, of a template web page display produced on a computer monitor of the user computer 106, stored in RAM or temporary memory of the user computer 106, by a computer processor of the user computer 106 by interpreting the template web page computer code file.

In at least one embodiment of the present invention no programming is done to request the template web page computer code file, rather the template web page computer code file is requested simply by a user typing a URL (universal resource locator) of the template web page computer code file in an address box of the user's browser on the user's computer monitor and hitting an enter button of the user's computer keyboard.

At step 1304, the server computer, such as the server computer 102, supplies the template web page computer code file to the user computer 106, in response to the request from the user computer 106.

At step 1306, the user computer 106 stores the template web page computer code file received from the server computer 102 in user computer memory, such as in temporary computer memory, such as in RAM (random access memory).

At step 1308, a browser computer program of the user computer 106 running on the computer processor of the user computer 106 interprets HTML tags of the template web page computer code file to display a template web page display, such for example as shown in FIG. 4A, on a computer monitor of the user computer 106. The template web page display includes a plurality of displayed visible items, such as visible items 482, 484*a-k*, 486, 488*a-i*, 490, 491, 492, 493, and 494 shown in FIG. 4A, each having content and attributes.

The template web page computer code file contains html tags of visible items with some default (initial) content and attributes. So these default content and attributes are already stored and available in RAM. The browser computer program running on the user computer 106 interprets the html tags and displays the visible items in a window. There is no need to store these content and attributes again after the visible items are displayed by the browser. The default content and attributes are already a part of the template web page computer code file which is already stored in RAM as soon as the template web page computer code file arrives at the user computer 106 and stored in RAM. The browser only interprets and displays what ever is already stored in RAM as part of the template web page computer code file.

The step of storing the template web page computer code file in the temporary computer memory of the user computer 106 may include causing the first plurality of control buttons, such as 401-478, the second plurality of visible items, and the host button 495 of the template web page display to be stored in a first location in the temporary computer memory of the user computer 106 and may include causing the fourth plurality of hidden fields, such as 496a-j, to be located at a second location in the temporary computer memory of the user computer 106.

However, when a user redefines the content and attributes of the visible items by redesigning the web page, the browser, running on a computer processor of the user computer 106, takes the new content and attributes from the redesigned web page and stores them in RAM of the user computer 106, and also passes all this information (regarding the redesigned web page, including the new content and attributes) to the server computer 102 when the host button, such as 495 is selected such as by mouse click by a user at the user computer 106.

At step 1310, a user modifies the template web page display by using the computer processor of the user computer 106 to execute functions of the script computer programming code of the template web page computer code file, to modify the plurality of displayed visible items, to form a plurality of modified displayed visible items. The user can click on control buttons such as 401-478 or host button 495 in the template web page display such as 400A of FIG. 4A which will be interpreted by the browser computer program running on the computer processor of the user computer 106 to cause the execution of functions of script computer programming code on the user computer. This will cause the modification of one or more of the plurality of displayed visible items, such as visible items 482, 484a-k, 486, 488a-i, 490, 491, 492, 493, and 494 of template web page display 400A shown in FIG. 4A, to form modified display items by the user computer 106. The computer processor of the user computer 106 displays the modified display items on a computer monitor of the user computer and stores the modified display items in RAM (random access memory) in computer memory of the user computer 106.

At step 1312, in response to selection of the host button 495 by the user, the user, by using the browser computer program running on the computer processor of the user computer 106, causes the content and attributes of all visible items, including modified and non-modified, of the modified template web page display through the execution of a function of the script computer programming code of the template web page computer code file, running on the computer processor of the user computer 106, to be taken from temporary computer memory of the user computer 106 and placed in hidden fields, such as 496a-j in a different location in temporary computer memory of the user computer 106. Thereafter, also in response to the selection of the host button 495, content and attributes of visible items in the plurality of hidden fields 496a-j, are taken from the location of hidden fields in temporary memory of user computer 106, and wrapped in a request object containing no html file in RAM of the user computer 106.

At step 1314, the browser computer program running on the computer processor of the user computer 106 causes the request object containing no html file to be transmitted to the server computer 102. The request object containing no html file does not contain any html files, but in at least one embodiment of the present invention, has only plain text containing the attributes and content of various visible items of the modified template web page display. The system, apparatus, and method of one or more embodiments of the present invention eliminates storing of files on a user computer's hard disk and the use of any software tool or module like a file manager to upload files (such as a file including HTML tags) to a server computer through manual interaction.

In the present application, a file is defined as a block of information stored on a permanent storage medium such as disk or magnetic tape.

In the present application, a request object containing no html file is a stream of bytes stored temporarily in a computer's temporary memory, such as RAM (Random Access Memory) before the computer's browser program delivers it to another computer (in this case object delivered from the user computer 106 to the server computer 102). A request object containing no html file is typically not stored on any permanent storage medium such as disk or magnetic tape.

At step 1316, the computer processor of the server computer 102 receives the request object containing no html file in local server computer memory such as RAM, of the server computer 102.

At step 1318, the server computer 102 is programmed to take content and attributes of all visible items out of the request object containing no html file and to store the content and attributes in a database, such as database 104 on or a part of the server computer 102 as text. The server computer 102 does not store the content and attributes as HTML tagged files or as any other kind of file on a hard disk of the server computer 102.

The content and attributes of the visible items which were stored in the database 104, are taken out of the database 104 by the server computer 102 in response to a visitor computer 108 request for a web page. The server computer 102, after retrieving the content and attributes from the database 104, transmits the content and attributes to the requesting visitor computer 108 along with print instructions. The visitor computer 108 or computer processor, running a visitor browser computer program, interprets the print statements, thereby displays a web page display.

In one or more embodiments of the present invention, the template web page computer code file does not comprise any code to wrap the content and attributes of all visible items as written to the hidden fields in a request object containing no html file. Rather, the browser computer program running on the user computer does that automatically. When any web page form is submitted to its server computer from a user computer, the browser computer program of the user computer automatically takes text from all the visible input fields and hidden fields of the particular web page form and wraps the text in a request object and sends the request object to the server.

In one or more embodiments of the present invention, the template web page computer code file comprises code to write the content and attributes of all visible items to hidden fields, which are located in temporary user computer memory. For example, the hidden fields or boxes 496a-j shown in image 400A of FIG. 4A, would be located in temporary user computer memory, but would not actually be displayed on the user computer monitor display of user computer 106. In at least one embodiment of the present invention, the content and attributes of all visible items, on either the template web page display or the modified template web page display are taken out from a storage location for visible items in temporary user computer memory and placed in a different storage location for hidden fields in temporary user computer memory. In this manner, the visible items are written to the hidden fields. In one embodiment, after the content and attributes of the visible items of the modified template web page are written to the hidden fields (i.e. taken from the storage location for visible items in temporary user computer memory and placed in a different storage location for hidden fields in temporary user computer memory) a browser computer program running on the user computer processor immediately submits the content and attributes of the modified template web page display to a server computer through a request object containing no html file.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising causing a user computer to request a template web page computer code file from a server computer in response to a request by a user through a web browser computer program running on the user computer;

supplying the template web page computer code file from the server computer to the user computer in response to the request, wherein the template web page computer code file includes code representing a first plurality of control buttons, a second plurality of visible items, a host button and a fourth plurality of hidden fields;

storing the template web page computer code file in a temporary computer memory of the user computer;

causing the user computer to interpret the template web page computer code file to display a template web page display on a user monitor of the user computer wherein the template web page display includes the first plurality of control buttons, the second plurality of visible items, and the host button;

causing the first plurality of control buttons, the second plurality of visible items, and the host button of the template web page display to be stored in a first location in the temporary computer memory of the user computer;

causing the fourth plurality of hidden fields to be located at a second location in the temporary computer memory of the user computer;

modifying the template web page display to form a modified template web page display by executing functions of a script computer programming code of the template web page computer code file, wherein the template web page display is modified by modifying one or more of the second plurality of visible items of the template web page display on the user monitor of the user computer; wherein the modified template web page display includes the first plurality of control buttons, a third plurality of visible items, which includes one or more modified visible items of the second plurality of visible items and any non-modified visible items of the second plurality of visible items, and the host button;

causing the third plurality of visible items of the modified template web page display to be stored in the temporary computer memory of the user computer;

receiving at the user computer, a user selection of the host button of the modified template web page display;

in response to the user selection of the host button, causing content and attributes of the third plurality of visible items of the modified template web page display to be taken from the first location in the temporary computer memory of the user computer and placed in the fourth plurality of hidden fields in the second location in the temporary computer memory of the user computer;

in response to the user selection of the host button, further causing the content and attributes of the third plurality of visible items of the modified template web page display to be taken from the fourth plurality of hidden fields in the second location in temporary computer memory and wrapped in a request object containing no html file in temporary memory of the user computer and sending the request object containing no html file to the server computer;

receiving the request object containing no html file at the server computer;

storing the request object containing no html file in temporary memory of the server computer;

causing the server computer to take the content and attributes of the third plurality of visible items of the modified template web page display out of the request object containing no html file and to store them as text in a database; and retrieving the content and attributes of the third plurality of visible items of the modified template web page display from the database, and transmitting them to a visitor computer with print instructions in response to a visitor request for a web page comprising the third plurality of visible items of the modified template web page display;

causing the browser computer program running on the visitor computer to interpret the print instructions to display a visitor web page display comprising the third plurality of visible items of the modified template web page display.

2. The method of claim 1 wherein the template web page computer code file includes HTML tags in addition to the script computer programming code;

and further comprising causing one or more functions of the script computer programming code to be executed at the user computer when a user clicks on one or more of the first plurality of control buttons of the template web page display on the user monitor of the user computer.

3. The method of claim 1 wherein the web browser computer program running on the user computer interprets HTML tags in the template web page computer code file to cause the display of the template web page display on the user monitor of the user computer.

4. The method of claim 1 wherein each of the visible items of the second plurality of visible items of the template web page display is resizable and movable by a user selecting one or more of the first plurality of control buttons to form the third plurality of visible items of the modified template web page display.

5. The method of claim 1 further comprising removing one or more visible items of the second plurality of visible items of the template web page display by a user selecting one or more of the first plurality of control buttons to form the third plurality of visible items of the modified template web page display.

6. The method of claim 1 further comprising adding one or more visible items to the second plurality of visible items of the template web page display by a user selecting one or more of the first plurality of control buttons to form the third plurality of visible items of the modified template web page display.

7. The method of claim 1 wherein at least two of the second plurality of visible items of the template web page display are part of a user facility form.

8. The method of claim 1 further comprising defining a particular visible item of the second plurality of visible items of the template web page display as global to form the third plurality of visible items of the modified template web page display by a user selecting one of the first plurality of control buttons;

and in response to defining the particular visible item of the second plurality of visible items of the template web page display as global, causing the server computer to display the particular visible item defined as global in all visitor web pages pertaining to a web site.

9. The method of claim 1 further comprising
defining a particular visible item of the second plurality of visible items of the template web page display as local to form the third plurality of visible items of the modified template web page display by a user selecting one of the first plurality of control buttons;
and in response to defining the particular visible item of the template web page display as local, causing the server computer to display the particular visible item defined as local only in that particular visitor web page representing the modified template webpage display wherein the particular visible item is defined as local.

10. The method of claim 1 further comprising
adding a horizontal line to the template web page display to form the modified template web page display by a user selecting one of the first plurality of control buttons.

11. The method of claim 1 further comprising
adding an image to the template web page display to form the modified template web page display in the temporary computer memory of the user computer by a user selecting one of the first plurality of control buttons.

12. The method of claim 1 wherein
the first plurality of control buttons includes a set of one or more control buttons, which when activated by a user through use of a computer interactive device of the user computer cause one or more visible items of the second plurality of visible items of the template web page display to move and be resized to form the third plurality of visible items of the modified template web page display.

13. The method of claim 1 further comprising
a user selecting a first visible item of the second plurality of visible items of the template web page display and further selecting one of the first plurality of control buttons;
in response to the user selecting the first visible item of the second plurality of visible items of the template web page display and further user selecting one of the first plurality of control buttons of the template web page display, displaying a second template web page display;
wherein the second template web page display includes a fifth plurality of control buttons, a sixth plurality of visible items, and a further host button;
wherein each of the sixth plurality of visible items includes content and attributes;
modifying the second template web page display to form a second modified template web page display by executing functions of a script computer programming code of a second template web page computer code file, wherein the second template web page display is modified by modifying one or more of the sixth plurality of visible items of the second template web page display on the user monitor of the user computer;
wherein the second modified template web page display includes the fifth plurality of control buttons, a seventh plurality of visible items, which includes one or more modified visible items of the sixth plurality of visible items and any non-modified visible items of the sixth plurality of visible items, and the further host button;
wherein each of the seventh plurality of visible items of the second modified template web page display includes content and attributes;
and further comprising submitting the content and attributes of the seventh plurality of visible items of the second modified template web page display to the server computer; and
receiving, at the server computer, the content and attributes of the seventh plurality of visible items of the second modified template web page display and storing them in a database.

14. The method of claim 13 comprising
causing the server computer to retrieve the content and attributes of the seventh plurality of visible items of the second modified template web page display from the database and to thereafter transmit the retrieved content and attributes of the seventh plurality of visible items of the second modified template web page display to the visitor computer;
and further comprising displaying a second visitor web page display comprising the seventh plurality of visible items of the second modified template web page display on a computer monitor of a visitor computer when a visitor at a visitor computer selects a particular visible item of a visitor web page representing the first visible item of the second plurality of visible items of the template web page display.

15. The method of claim 13 wherein
the second template web page display includes a re-designable form for any one of webmail, visitor registration, forgot password, password reset, and chat box.

16. The method of claim 1
further comprising moving and resizing at least one of the second plurality of visible items of the template web page display to form the third plurality of visible items of the modified template web page display by using a computer interactive device of the user computer to drag and drop the at least one of the second plurality of visible items of the template web page display.

17. The method of claim 1 wherein
the first plurality of control buttons of the template web page display includes a set of one or more control buttons, which when activated by a user through use of a computer interactive device of the user computer causes one or more visible items of the second plurality of visible items of the template web page display to be changed in one or more of background color, border color, border thickness, font family, font size, font color, bold, underlining, and italics.

18. The method of claim 1 wherein
the first plurality of control buttons of the template web page display includes a set of one or more control buttons to define mouse-over effects for one or more of background color, border color, border thickness, font family, font size, font color, bold, underlined, and italics which can also be seen in a visitor web page display corresponding to the modified template web page display.

19. The method of claim 1 wherein
the first plurality of control buttons of the template web page display includes a set of control buttons which when activated using a computer interactive device of the user computer, move and resize a visible item of the second plurality of visible items by one pixel.

20. The method of claim 1 wherein
the first plurality of control buttons of the template web page display includes a set of control buttons which when activated using a computer interactive device of the user computer move and resize a visible item of the second plurality of visible items by more than one pixel at a time.

* * * * *